(12) United States Patent
Cava

(10) Patent No.: US 11,792,474 B2
(45) Date of Patent: *Oct. 17, 2023

(54) FAILURE RECOVERY USING DIFFERENTIAL MEDIA PRESENTATION DESCRIPTIONS FOR VIDEO STREAMING

(71) Applicant: HULU, LLC, Santa Monica, CA (US)

(72) Inventor: Zachary Cava, Seattle, WA (US)

(73) Assignee: HULU, LLC, Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/661,906

(22) Filed: May 3, 2022

(65) Prior Publication Data

US 2022/0264177 A1    Aug. 18, 2022

Related U.S. Application Data

(63) Continuation of application No. 16/941,389, filed on Jul. 28, 2020, now Pat. No. 11,343,566, which is a (Continued)

(51) Int. Cl.
*H04N 21/44* (2011.01)
*H04N 21/4402* (2011.01)
(Continued)

(52) U.S. Cl.
CPC ....... *H04N 21/4402* (2013.01); *H04L 65/764* (2022.05); *H04N 21/278* (2013.01);
(Continued)

(58) Field of Classification Search
CPC ............... H04L 65/604; H04L 65/1069; H04L 65/4084; H04L 65/605; H04L 65/80;
(Continued)

(56) References Cited

U.S. PATENT DOCUMENTS 6,665,726 B1   12/2003 Leighton et al.
8,752,085 B1   6/2014 Brueck et al.
(Continued)

FOREIGN PATENT DOCUMENTS

CN   104969560 A   10/2015
CN   105474672 A   4/2016
(Continued)

OTHER PUBLICATIONS

Chinese Application Serial No. 201980029217.6, Office Action dated Jun. 27, 2022, 20 pgs.
(Continued)

*Primary Examiner* — Omar S Parra
(74) *Attorney, Agent, or Firm* — Kwan & Olynick LLP

(57) ABSTRACT

In some embodiments, a method receives a request from a client device. The request includes location information for an update to a media presentation description for a media presentation. The method uses the location information to determine that the client device has not received a first segment based on the location information. The media presentation description is currently sending updates for a second segment. The location information is used to identify that the update to the media presentation description should include the first segment and the second segment. The method sends an instance of the media presentation description that includes update information for the first segment and the second segment to update a stored version of the media presentation description for the client device.

20 Claims, 25 Drawing Sheets

Related U.S. Application Data continuation of application No. 16/378,384, filed on Apr. 8, 2019, now Pat. No. 10,771,842.

(60) Provisional application No. 62/654,964, filed on Apr. 9, 2018.

(51) Int. Cl.

| | | |
|---|---|---|
| *H04N 21/278* | (2011.01) | |
| *H04N 21/61* | (2011.01) | |
| *H04N 21/431* | (2011.01) | |
| *H04N 21/478* | (2011.01) | |
| *H04N 21/81* | (2011.01) | |
| *H04L 65/75* | (2022.01) | |

(52) U.S. Cl.
CPC ..... *H04N 21/4314* (2013.01); *H04N 21/4316* (2013.01); *H04N 21/478* (2013.01); *H04N 21/6125* (2013.01); *H04N 21/6175* (2013.01); *H04N 21/8133* (2013.01)

(58) Field of Classification Search
CPC ............ H04N 21/278; H04N 21/4314; H04N 21/4316; H04N 21/4402; H04N 21/478; H04N 21/6125; H04N 21/6175; H04N 21/8133; H04N 21/26258; H04N 21/2668; H04N 21/812; H04N 21/8456
See application file for complete search history.

(56) References Cited

U.S. PATENT DOCUMENTS

| | | |
|---|---|---|
| 9,510,025 B1 | 11/2016 | Einarsson et al. |
| 10,531,165 B1 | 1/2020 | Evans |
| 11,039,206 B2 | 6/2021 | Cava |
| 11,343,566 B2 | 5/2022 | Cava et al. |
| 11,477,521 B2 | 10/2022 | Cava |
| 2003/0101144 A1 | 5/2003 | Moreno |
| 2011/0179356 A1 | 7/2011 | Bassali et al. |
| 2011/0255535 A1 | 10/2011 | Tinsman |
| 2011/0307581 A1 | 12/2011 | Furbeck et al. |
| 2012/0198031 A1 | 8/2012 | Bouazizi |
| 2014/0019587 A1 | 1/2014 | Giladi |
| 2014/0143806 A1 | 5/2014 | Steinberg et al. |
| 2014/0150019 A1 | 5/2014 | Ma et al. |
| 2014/0222962 A1 | 8/2014 | Mao et al. |
| 2014/0317307 A1 | 10/2014 | Giladi |
| 2015/0106841 A1 | 4/2015 | Wolf et al. |
| 2015/0324379 A1 | 11/2015 | Danovitz et al. |
| 2016/0182582 A1 | 6/2016 | Wagenaar et al. |
| 2016/0261677 A1 | 9/2016 | Lotfallah et al. |
| 2016/0294894 A1 | 10/2016 | Miller |
| 2016/0345074 A1 | 11/2016 | Serbest et al. |
| 2019/0296840 A1 | 9/2019 | Vermeyden et al. |
| 2019/0313147 A1 | 10/2019 | Cava et al. |
| 2019/0313150 A1 | 10/2019 | Cava |
| 2019/0342356 A1 | 11/2019 | Thomas et al. |
| 2020/0359086 A1 | 11/2020 | Cava et al. |
| 2020/0404361 A1 | 12/2020 | Lohmar et al. |
| 2021/0105333 A1 | 4/2021 | Chen et al. |
| 2021/0297733 A1 | 9/2021 | Cava |

FOREIGN PATENT DOCUMENTS

| | | |
|---|---|---|
| CN | 108886511 A | 11/2018 |
| CN | 112055972 A | 12/2020 |
| CN | 112106375 A | 12/2020 |
| EP | 3179688 A1 | 6/2017 |
| EP | 3777203 A1 | 2/2021 |
| EP | 3777204 A1 | 2/2021 |
| WO | 2012093202 A1 | 7/2012 |
| WO | 2014176014 A1 | 10/2014 |
| WO | 2018122402 A1 | 7/2018 |
| WO | 2019199809 A1 | 10/2019 |
| WO | 2019199820 A1 | 10/2019 |

OTHER PUBLICATIONS

Chinese Application Serial No. 201980029032.5, Office Action dated Jul. 5, 2022, 32 pgs.
Chinese Search Report, Application No. 2019800290325, dated Jul. 5, 2022, 2 pages.
Chinese Search Report, Application No. 2019800292176, dated Jun. 27, 2022, 3 pages.
Alex Giladi (Huawei): "MPD Updates", 103. MPEG Meeting; Jan. 21, 2013-Jan. 25, 2013; Geneva; (Motion Picture Expert Group or ISO/IEC JTC1/SC29/WG11), No. m28045 Jan. 16, 2013 (Jan. 16, 2013), XP030056598, Retrieved from the Internet:URL: http://phenix.int-evry.fr/mpeg/doc_end_user/documents/103_Geneva/wg11/m28045-v1-m28045_EfficientMpdUpdate_r1.zip m28045_EfficientMpdUpdate_r1.docx [retrieved on Jan. 16, 2013].
Article entitled: "Information Technology—Dynamic Adaptive Streaming Over HTTP (DASH)"; ISO/IEC 23009-1; Second edition; May 15, 2014; 152 pages.
David Furbeck: "DASH MPD Delta Files", 94. MPEG Meeting; Oct. 11, 2010-Oct. 15, 2010; Guangzhou; (Motion Picture Expert Group or ISO/IEC JTC1/SC29/WG11),No. M18482; m184824 Oct. 2010 (Oct. 4, 2010), XP030047072, Retrieved from the Internet: URL: http://phenix int-evry.fr/mpeg/doc_end_user/documents/94_Guangzhou/wg11/m18482-v1-m18482.zip m18482.doc[retrieved on Oct. 4, 2010].
European Application Serial No. 19785071.2, Search Report dated Jan. 10, 2022, 10 pages.
International Search Report & Written Opinion for PCT Application PCT/US2019/026563 dated Jul. 25, 2019, 13 pages.
International Search Report & Written Opinion for PCT Application PCT/US2019/026574 dated Aug. 5, 2019, 13 pages.
European Application Serial No. 19785072.0, Search Report dated May 4, 2022, 11 pgs.
Chinese Office Action, Application No. 201980029032.5, dated Dec. 14, 2022,.
Chinese Telephonic Notice, Application No. 201980029032.5, dated Mar. 1, 2023, 12 pages.
European Office Action Application No. 19785072.0, dated Jan. 16, 2023, 5 pages.

```
400

<?xml version="1.0" encoding="utf-8"?>
<MPD type="dynamic" xmlns="urn:mpeg:dash:schema:mpd:2011" ...>                408
  <Location>https://example.com/dash/live/channel.mpd?t=70</Location>
  <Period id="foo-1" start="PT0.0S">
    <AdaptationSet id="1" mimeType="video/mp4" ...>
      <SegmentTemplate presentationTimeOffset="0" timescale="1" ...>
        <SegmentTimeline>
          <S d="10" t="0"/>
          ...
          <S d="10" t="60"/>
        </SegmentTimeline>
      </SegmentTemplate>
      <Representation id="1080_30" .../>
      <Representation id="720_30" .../>
      ...
    </AdaptationSet>
    <AdaptationSet id="2" mimeType="audio/mp4" ...>
      <SegmentTemplate presentationTimeOffset="0" timescale="1" ...>
        <SegmentTimeline>
          <S d="5" t="0"/>
          ...
          <S d="5" t="60"/>
        </SegmentTimeline>
      </SegmentTemplate>
      <Representation id="2_0" .../>
    </AdaptationSet>
  </Period>
</MPD>
```

FIG. 4

```xml
600

<?xml version="1.0" encoding="utf-8"?>
<MPD>
  <Location>https://example.com/dash/live/channel.mpd?t=90</Location>        608
  <EssentialProperty schemeIdUri="urn:com:hulu:schema:mpd:2017:patch"/>
  <Period id="foo-1">
    <AdaptationSet id="1">
      <SegmentTemplate>
        <SegmentTimeline>
          <S d="10" t="70"/>
          <S d="10" t="80"/>
        </SegmentTimeline>
      </SegmentTemplate>
    </AdaptationSet>
    <AdaptationSet id="2">
      <SegmentTemplate>
        <SegmentTimeline>
          <S d="5" t="70"/>
          <S d="5" t="75"/>
          <S d="5" t="80"/>
          <S d="5" t="85"/>
        </SegmentTimeline>
      </SegmentTemplate>
    </AdaptationSet>
  </Period>
</MPD>
```

602 — EssentialProperty line
604 — AdaptationSet id="1" block
606 — AdaptationSet id="2" block
608 — Location line

FIG. 6

```
700                                                                      708
  <?xml version="1.0" encoding="utf-8"?>
  <MPD>
    <Location>https://example.com/dash/live/channel.mpd?t=90</Location>
    <EssentialProperty schemeIdUri="urn:com:hulu:schema:mpd:2017:patch"/>
702 <Period id="foo-2" start="PT70.0S">
      <AdaptationSet id="1" mimeType="video/mp4" ...>
        <SegmentTemplate presentationTimeOffset="70" timescale="1" ...>
          <SegmentTimeline>
            <S d="10" t="0"/>
            <S d="10" t="10"/>
704       </SegmentTimeline>
        </SegmentTemplate>
        <Representation id="1080_30" .../>
        <Representation id="720_30" .../>
        ...
      </AdaptationSet>
      <AdaptationSet id="2" mimeType="audio/mp4" ...>
        <SegmentTemplate presentationTimeOffset="70" timescale="1" ...>
          <SegmentTimeline>
            <S d="5" t="0"/>
            <S d="5" t="5"/>
706         <S d="5" t="10"/>
            <S d="5" t="15"/>
          </SegmentTimeline>
        </SegmentTemplate>
        <Representation id="2_0" .../>
      </AdaptationSet>
    </Period>
  </MPD>
```

FIG. 7

```xml
800
  <?xml version="1.0" encoding="utf-8"?>                                806
  <MPD>
    <Location>https://example.com/dash/live/channel.mpd?t=90</Location>
    <EssentialProperty schemeIdUri="urn:com:hulu:schema:mpd:2018:patch"/>
    <Period id="foo-1">
      <AdaptationSet id="1">
        <SegmentTemplate>
          <SegmentTimeline>
            <S d="10" t="80"/>
          </SegmentTimeline>
        </SegmentTemplate>
      </AdaptationSet>
802   <AdaptationSet id="2">
        <SegmentTemplate>
          <SegmentTimeline>
            <S d="10" t="80"/>
          </SegmentTimeline>
        </SegmentTemplate>
      </AdaptationSet>
    </Period>
    </Period>
    <Period id="foo-2" start="PT80.0S">
      <AdaptationSet id="1" mimeType="video/mp4" ...>
        <SegmentTemplate presentationTimeOffset="80" timescale="1" ...>
          <SegmentTimeline>
            <S d="10" t="0"/>
          </SegmentTimeline>
        </SegmentTemplate>
        <Representation id="1080_30" .../>
        <Representation id="820_30" .../>
        ...
804   </AdaptationSet>
      <AdaptationSet id="2" mimeType="audio/mp4" ...>
        <SegmentTemplate presentationTimeOffset="80" timescale="1" ...>
          <SegmentTimeline>
            <S d="5" t="0"/>
            <S d="5" t="5"/>
          </SegmentTimeline>
        </SegmentTemplate>
        <Representation id="2_0" .../>
      </AdaptationSet>
    </Period>
  </MPD>
```

FIG. 8

| t | URL Requested | Segments Returned | MPD.Location in Response | |
|---|---|---|---|---|
| 12 | .../CTN.mpd?start=0 | a, b, c, d | .../CTN.mpd?t=12 | 1010 |
| 15 | .../CTN.mpd?t=12 | e | .../CTN.mpd?t=15 | 1012 |
| 18 | .../CTN.mpd?t=15 | f | .../CTN.mpd?t=18 | |
| 21 | .../CTN.mpd?t=18 | g | .../CTN.mpd?t=21 | |
| 24 | .../CTN.mpd?t=21 | h | .../CTN.mpd?t=24 | |
| 27 | .../CTN.mpd?t=24 | i | .../CTN.mpd?t=27 | |
| 30 | .../CTN.mpd?t=27 | j | .../CTN.mpd?t=30 | |

| t | URL Requested | Segments Returned | MPD.Location in Response |
|---|---|---|---|
| 19 | .../CTN.mpd?start=0 | a, b, c, d, e, f | .../CTN.mpd?t=18 |
| 22 | .../CTN.mpd?t=18 | g | .../CTN.mpd?t=21 |
| 25 | .../CTN.mpd?t=21 | h | .../CTN.mpd?t=24 |
| 28 | .../CTN.mpd?t=24 | i | .../CTN.mpd?t=27 |
| 31 | .../CTN.mpd?t=27 | j | .../CTN.mpd?t=30 |

FIG. 11

| t | URL Requested | Segments Returned | MPD.Location in Response |
|---|---|---|---|
| 19 | .../CTN.mpd?start=0 | a, b, c, d, e, f | .../CTN.mpd?t=18 |
| 22 | .../CTN.mpd?t=18 | <no response network error> | |
| 25 | .../CTN.mpd?t=18 | g, h | .../CTN.mpd?t=24 |
| 28 | .../CTN.mpd?t=24 | i | .../CTN.mpd?t=27 |

FIG. 12

| T | URL Requested | Segments | MPD.Location in Response | Cacheable? |
|---|---|---|---|---|
| 12 | live/channel.mpd?start=0 | a, b, c, d | live/channel.mpd?t=12 | Yes |
| 15 | live/channel.mpd?t=12 | e | live/channel.mpd?t=15 | Yes |
| 18 | live/channel.mpd?t=15 | 1, 2, 3, 4, 5 | live/channel.mpd?t=30 | No |
| 21 | live/channel.mpd?t=30 | <none> | | Yes |
| 24 | live/channel.mpd?t=30 | <none> | | Yes |
| 27 | live/channel.mpd?t=30 | <none> | | Yes |
| 30 | live/channel.mpd?t=30 | <none> | | Yes |
| 33 | live/channel.mpd?t=33 | k | | Yes |

FIG. 15

| t | URL Requested | Segments | MPD.Location in Response | Cacheable? |
|---|---|---|---|---|
| 12 | live/channel.mpd?start=0 | a, b, c, d | live/channel.mpd?t=12 | Yes |
| 15 | live/channel.mpd?t=12 | e | live/channel.mpd?t=15 | Yes |
| 18 | live/channel.mpd?t=15 | <none> | (as 302 redirect) ads/channel.mpd?d=15&rt=30 | No |
| 18 | ads/channel.mpd?d=15&rt=30 | 1, 2, 3, 4, 5 | live/channel.mpd?t=30 | No |
| 21 | live/channel.mpd?t=30 | <none> | | Yes |
| 24 | live/channel.mpd?t=30 | <none> | | Yes |
| 27 | live/channel.mpd?t=30 | <none> | | Yes |
| 30 | live/channel.mpd?t=30 | <none> | | Yes |
| 33 | live/channel.mpd?t=33 | k | | Yes |

FIG. 16

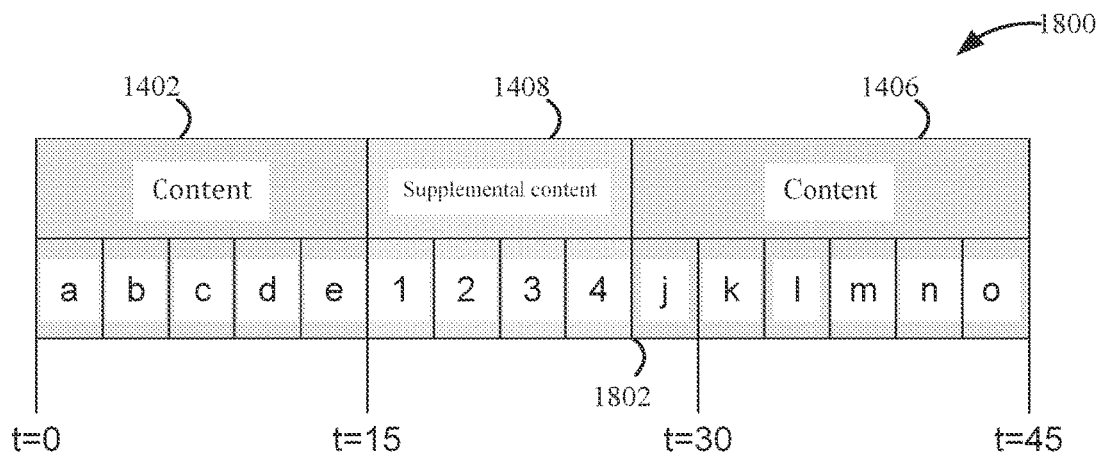

FIG. 18A

| t | URL Requested | Segments | MPD.Location in Response | Cacheable? |
|---|---|---|---|---|
| 12 | live/channel.mpd?start=0 | a, b, c, d | live/channel.mpd?t=12 | Yes |
| 15 | live/channel.mpd?t=12 | e | live/channel.mpd?t=15 | Yes |
| 18 | live/channel.mpd?t=15 | 1, 2, 3, 4, 5 | live/channel.mpd?t=30&b=1234 | No |
| 21 | live/channel.mpd?t=30&b=1234 | <none> | | Yes |
| 24 | live/channel.mpd?t=30&b=1234 | <none> | | Yes |
| 27 | live/channel.mpd?t=30&b=1234 | <none> | | Yes |
| 30 | live/channel.mpd?t=30&b=1234 | j | live/channel.mpd?t=30 | Yes |
| 33 | live/channel.mpd?t=33 | k | | Yes |

FIG. 18B

```
<?xml version="1.0" encoding="utf-8"?>
<MPD type="dynamic" xmlns="urn:mpeg:dash:schema:mpd:2011" ...>
    <Location>https://example.com/dash/live/channel.mpd?t=70</Location>
    <EssentialProperty schemeIdUri="urn:mpeg:dash:urlparam:2016">
2002  <up:ExtUrlQueryInfo useMPDUrlQuery="true" includeInRequests="mpd"
queryTemplate="$query:ad_session_id=ad_session_id$"/>
    </EssentialProperty>
    <Period id="foo-1" start="PT0.0S">
       <AdaptationSet id="1" mimeType="video/mp4" ...>
          <SegmentTemplate presentationTimeOffset="0" timescale="1" ...>
             <SegmentTimeline>
                <S d="10" t="0"/>
                ...
                <S d="10" t="60"/>
             </SegmentTimeline>
          </SegmentTemplate>
          <Representation id="1080_30" .../>
          <Representation id="720_30" .../>
          ...
       </AdaptationSet>
       <AdaptationSet id="2" mimeType="audio/mp4" ...>
          <SegmentTemplate presentationTimeOffset="0" timescale="1" ...>
             <SegmentTimeline>
                <S d="5" t="0"/>
                ...
                <S d="5" t="65"/>
             </SegmentTimeline>
          </SegmentTemplate>
          <Representation id="2_0" .../>
       </AdaptationSet>
    </Period>
</MPD>
```

FIG. 20

```
<?xml version="1.0" encoding="utf-8"?>
<MPD type="dynamic" xmlns="urn:mpeg:dash:schema:mpd:2011" ...>

<Location>https://example.com/dash/ads/dai.mpd?b=abc&d=60&rt=130</Location>
  <EssentialProperty
schemeIdUri="urn:com:hulu:schema:mpd:2017:patch"/>
  <EssentialProperty schemeIdUri="urn:mpeg:dash:urlparam:2016">
    <up:ExtUrlQueryInfo useMPDUrlQuery="true" includeInRequests="mpd"
queryTemplate="$query:ad_session_id=ad_session_id$"/>
  </EssentialProperty>
</MPD>
```

```xml
<?xml version="1.0" encoding="utf-8"?>
<MPD type="dynamic" xmlns="urn:mpeg:dash:schema:mpd:2011" ...>

<Location>https://example.com/dash/live/channel.mpd?b=abc&t=130</Location>
   <EssentialProperty schemeIdUri="urn:com:hulu:schema:mpd:2017:patch"/>
   <EssentialProperty schemeIdUri="urn:mpeg:dash:urlparam:2016">
      <up:ExtUrlQueryInfo useMPDUrlQuery="true" includeInRequests="mpd" queryTemplate="$query:ad_session_id=ad_session_id$"/>
   </EssentialProperty>
   <Period id="ad-1" start="PT70.0S">
      <AdaptationSet id="1" mimeType="video/mp4" ...>
         <SegmentTemplate presentationTimeOffset="0" timescale="1" ...>
            <SegmentTimeline>
               <S d="10" t="0"/>
               <S d="5" t="10"/>
            </SegmentTimeline>
         </SegmentTemplate>
         <Representation id="1080_30" .../>
         <Representation id="720_30" .../>
         ...
      </AdaptationSet>
      <AdaptationSet id="2" mimeType="audio/mp4" ...>
         <SegmentTemplate presentationTimeOffset="0" timescale="1" ...>
            <SegmentTimeline>
               <S d="5" t="0"/>
               <S d="5" t="5"/>
               <S d="5" t="10"/>
            </SegmentTimeline>
         </SegmentTemplate>
         <Representation id="2_0" .../>
      </AdaptationSet>
   </Period>
   <Period id="ad-2" start="PT85.0S">...</Period>
   <Period id="ad-3" start="PT100.0S">...</Period>
   <Period id="ad-4" start="PT115.0S">...</Period>
</MPD>
```

FIG. 22

```xml
<?xml version="1.0" encoding="utf-8"?>
<MPD type="dynamic" xmlns="urn:mpeg:dash:schema:mpd:2011" ...>
  <Location>https://example.com/dash/live/channel.mpd?t=140</Location>
  <EssentialProperty schemeIdUri="urn:com:hulu:schema:mpd:2017:patch"/>
  <EssentialProperty schemeIdUri="urn:mpeg:dash:urlparam:2016">
    <up:ExtUrlQueryInfo useMPDUrlQuery="true" includeInRequests="mpd" queryTemplate="$query:ad_session_id=ad_session_id$"/>
  </EssentialProperty>
  <Period id="foo-2" start="PT130.0S">
    <AdaptationSet id="1" mimeType="video/mp4" ...>
      <SegmentTemplate presentationTimeOffset="0" timescale="1" ...>
        <SegmentTimeline>
          <S d="10" t="0"/>
        </SegmentTimeline>
      </SegmentTemplate>
      <Representation id="1080_30" .../>
      <Representation id="720_30" .../>
      ...
    </AdaptationSet>
    <AdaptationSet id="2" mimeType="audio/mp4" ...>
      <SegmentTemplate presentationTimeOffset="0" timescale="1" ...>
        <SegmentTimeline>
          <S d="5" t="0"/>
          <S d="5" t="5"/>
        </SegmentTimeline>
      </SegmentTemplate>
      <Representation id="2_0" .../>
    </AdaptationSet>
  </Period>
</MPD>
```

FIG. 23

```
<?xml version="1.0" encoding="utf-8"?>
<MPD type="dynamic" xmlns="urn:mpeg:dash:schema:mpd:2011" ...>
  <Location>https://example.com/dash/live/channel.mpd?t=100</Location>
  <EssentialProperty
schemeIdUri="urn:com:hulu:schema:mpd:2017:patch"/>
  <EssentialProperty schemeIdUri="urn:mpeg:dash:urlparam:2016">
    <up:ExtUrlQueryInfo useMPDUrlQuery="true" includeInRequests="mpd"
queryTemplate="$query:ad_session_id=ad_session_id$"/>
  </EssentialProperty>
  <Period id="foo-2" start="PT90.0S">
    <AdaptationSet id="1" mimeType="video/mp4" ...>
      <SegmentTemplate presentationTimeOffset="0" timescale="1" ...>
        <SegmentTimeline>
          <S d="10" t="0"/>
        </SegmentTimeline>
      </SegmentTemplate>
      <Representation id="1080_30" .../>
      <Representation id="720_30" .../>
      ...
    </AdaptationSet>
    <AdaptationSet id="2" mimeType="audio/mp4" ...>
      <SegmentTemplate presentationTimeOffset="0" timescale="1" ...>
        <SegmentTimeline>
          <S d="5" t="0"/>
          <S d="5" t="5"/>
        </SegmentTimeline>
      </SegmentTemplate>
      <Representation id="2_0" .../>
    </AdaptationSet>
  </Period>
</MPD>
```

FIG. 24

FAILURE RECOVERY USING DIFFERENTIAL MEDIA PRESENTATION DESCRIPTIONS FOR VIDEO STREAMING

CROSS REFERENCE TO RELATED APPLICATIONS

This application is a continuation application and, pursuant to 35 U.S.C. § 120, is entitled to and claims the benefit of earlier filed application U.S. application Ser. No. 16/941,389, entitled "SUPPLEMENTAL CONTENT INSERTION USING DIFFERENTIAL MEDIA PRESENTATION DESCRIPTIONS FOR VIDEO STREAMING", filed Jul. 28, 2020, which is a continuation of U.S. application Ser. No. 16/378,384, entitled "SUPPLEMENTAL CONTENT INSERTION USING DIFFERENTIAL MEDIA PRESENTATION DESCRIPTIONS FOR VIDEO STREAMING", filed Apr. 8, 2019, which claims priority to U.S. Provisional App. No. 62/654,964, entitled "DIFFERENTIAL MANIFESTS FOR VIDEO STREAMING", filed Apr. 9, 2018, the contents of all of which are incorporated herein by reference in its entirety.

BACKGROUND

Live streaming requires continuous delivery of segments to clients using a media presentation description. Dynamic Adaptive Streaming over HTTP (DASH) is one type of live streaming protocol. In DASH, clients acquire segment information via polling protocols built into the DASH specification. To enable features like program start over, digital video recorder (DVR) windows, and seamless rollover, servers continually send updates to a media presentation description that includes all known stream information from the time the client joined the stream. The new media presentation description includes some new information for additional segments, but also includes all the previous information that was sent, such as stream initialization information and the previous segments. The repeated sending of this information wastes server and client computation time as well as bandwidth as very little new information is presented in a media presentation description that is received on each polling request.

BRIEF DESCRIPTION OF THE DRAWINGS

FIG. 4 depicts an example of a media presentation description according to some embodiments.

FIG. 6 depicts an example of a patch that extends in-memory media presentation description according to some embodiments.

FIG. 7 depicts a patch that extends the in-memory media presentation description by providing a new period whose identifier does not match any period in the in-memory media presentation description according to some embodiments.

FIG. 8 depicts a patch that extends the in-memory media presentation description for an existing period and also provides a new period according to some embodiments.

FIG. 11 depicts the second client's call pattern according to some embodiments.

FIG. 12 depicts a call flow showing the failure recovery according to some embodiments.

FIG. 15 shows a table of a client query pattern according to some embodiments.

FIG. 16 depicts another table for a client query pattern in which different endpoints for the manifest presentation description and the supplemental content manifest are used according to some embodiments.

FIG. 18A shows a timeline for cutting the break short according to some embodiments.

FIG. 18B depicts table for a client query pattern in which a supplemental content break is cut short according to some embodiments.

FIG. 20 depicts an initial manifest according to some embodiments.

FIG. 21 depicts an example of a patch that directs to dynamic content replacement according to some embodiments.

FIG. 22 depicts an example of an supplemental content manifest according to some embodiments.

FIG. 23 depicts a patch that is returned to the client after the break according to some embodiments.

FIG. 24 depicts an example of a manifest presentation description patch that cuts the previously provided break differential manifest presentation description short according to some embodiments.

DETAILED DESCRIPTION

Figure 1:
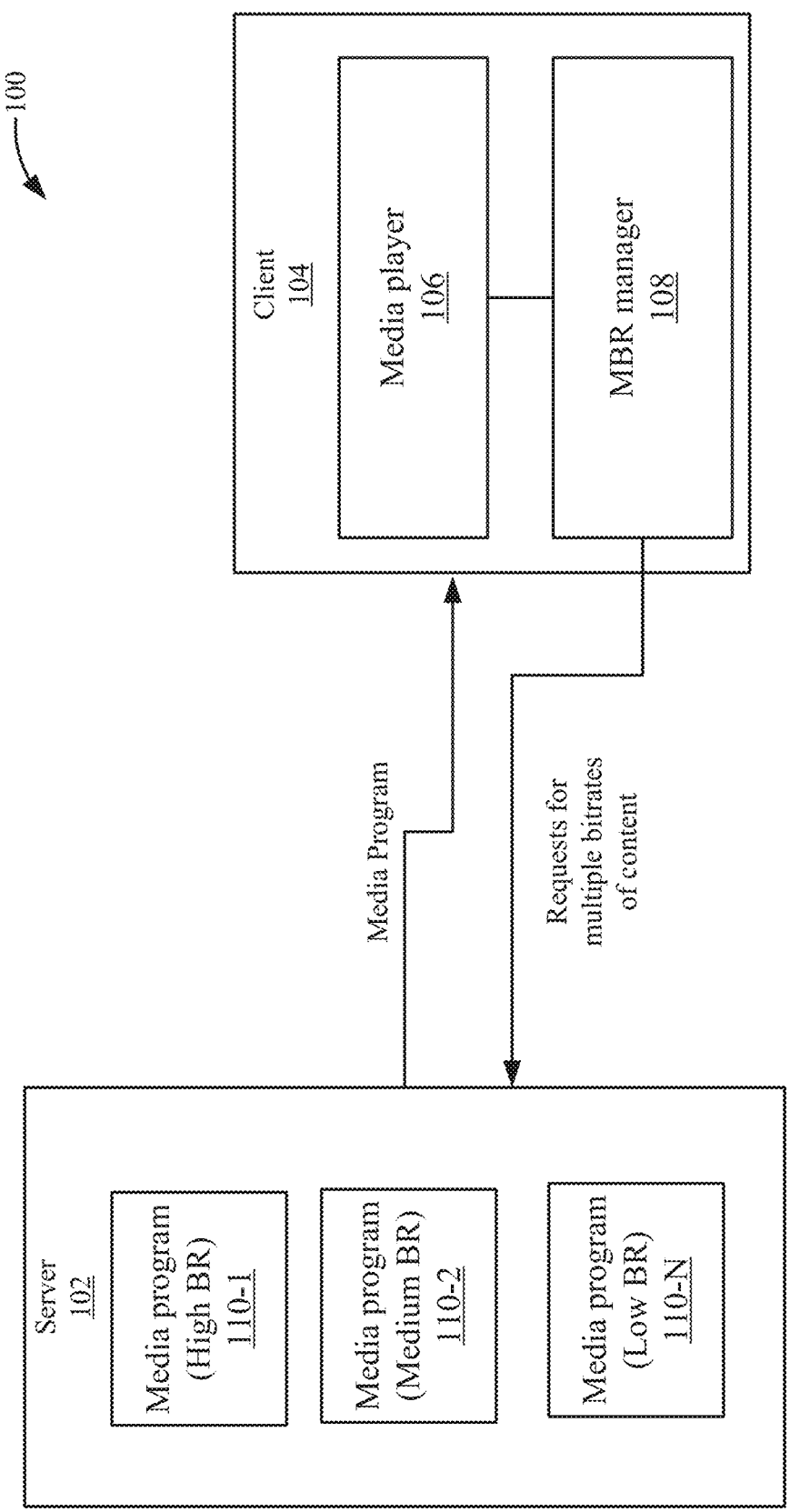
FIG. 1 depicts a system for a multiple bitrate (MBR) switching algorithm according to one embodiment.

Described herein are techniques for a video streaming system. In the following description, for purposes of explanation, numerous examples and specific details are set forth in order to provide a thorough understanding of some embodiments. Some embodiments as defined by the claims may include some or all of the features in these examples alone or in combination with other features described below and may further include modifications and equivalents of the features and concepts described herein.

Some embodiments calculate a differential of first information that is available for a media presentation and second information that a client has already received. Then, a server only sends the differential in a media presentation description to the client to reduce processing and transport costs. To stream a media presentation, such as one that is occurring live, a client needs to continually receive segment information from the server that describes the media presentation as it progresses in time. Conventionally, the segment information is sent by having the client refresh the media presentation description that the client has received on a periodic basis, in which the refreshed media presentation description would contain all segment information from the current point in time back to the original start of the media presentation when the client joined. As the media presentation continues, the media presentation description continues to grow in size with additional information for more segments, which takes more and more time to generate on the server side and more and more time to parse on the client side. Further, the client uses more and more memory to store the media presentation description as it grows. Also, all but the last few segments in the refreshed media presentation description will be a repeat of information the client already knows, causing the data transfer to be more and more wasteful.

To complicate matters more, for the clients to have seamless transition experiences from program to program, the clients cannot re-initialize their media players as it would cause momentary buffering and a black screen to be played and seen by a user. This is conventionally solved by having clients join a stream at a specific start time and growing the media presentation description to a maximum window size, and once the media presentation description reaches this maximum size, old segments are removed from the beginning as new segments are added to the end. This approach greatly increases the cache used by the media presentation description as users can join any program and remain on the stream until their authorization expires, which may mean 18 hours' worth of six hour media presentation descriptions must be served to the client, which increases the previously stated computational requirements for clients and servers.

Some embodiments use a differential based media presentation description (MPD) that continually extends a media presentation description via patches. The patches provide new information to a client without including all the previously sent information (e.g., a differential between all the known information and what information the client has received). A server inserts status information in the patches that the client uses to request the next segment or segments. Using the status information, the server can know what information the client has already received and send only the newly required information. .

The only current provisions for client extended timeline information within the DASH specification are the use of a negative repeat count for the last announced Segment entry (S@r) that signals the availability of future segments with equal duration and the inclusion of the next segment information within a movie fragment box (moof) of the last downloaded segment. While these provisions allow the timeline to be extended by the client, the provisions do not describe larger structure changes in the media presentation description such as period cuts or additional event stream data, so the client must still refresh the whole media presentation description to get this information. To bridge this gap, some embodiments send a media presentation description patch. Upon a client receiving the media presentation description patch, the client uses the patch to update an in-memory media presentation description instead of wholesale replacing the media presentation description.

System Overview

FIG. 1 depicts a system 100 for a multiple bitrate (MBR) switching algorithm according to one embodiment. System 100 includes a server 102 and a client 104. Although one instance of server 102 and client 104 are shown, multiple instances of server 102 and client 104 may be used.

Server 102 may deliver media presentations 110 to client 104. In one example, server 102 includes various media presentations, such as video (e.g., a title or show) that have been (or will be) encoded in multiple bitrates. For example, a media presentation 110 has been divided into segments that an encoder encodes at multiple bitrates, from high to low. As shown, a media presentation is stored in different versions (i.e., bitrates) as media presentation 110-1 (high bitrate), media presentation 110-2 (medium bitrate), ..., and media presentation 110-N (low bitrate). The different bitrates provide videos at different levels of quality. For example, a higher bitrate video will be of a higher quality than the medium bitrate, and the medium bitrate of a higher quality than the lower bitrate. Although these encodings are described, various embodiments may include different encodings at any number of bitrates.

Client 104 may include various user devices, such as cellular phones, set top boxes, streaming devices, personal computers, tablet computers, etc. Client 104 may include a media player 106 that can play the media presentation. For example, media player 106 may play video and/or audio.

Client 104 receives the media presentation from server 102. For example, client 104 (e.g., media player 106) may request segments of the media presentation from server 102. While receiving the segments of the media presentation, client 104 can evaluate the bandwidth in which client 104 receives the segments. One evaluation client 104 may perform is to measure the amount of the media presentation (e.g., video) received over a period of time to estimate the available bandwidth.

Depending on the available bandwidth, client 104 may make decisions on which bitrate (or version) of the media presentation to request. For example, an MBR manager 108 determines which version of the media presentation to request for a segment of the media presentation.

MBR manager 108 may use an MBR algorithm to determine when to switch to a different bitrate version of the media presentation. The MBR algorithm analyzes the available bandwidth and possibly other factors (e.g., computer processing unit load) to determine when to switch to a different bitrate. For example, if the MBR algorithm determines that the available bitrate is 2 Mbps and client 104 is requesting segments of the media presentation at a bitrate of 1 Mbps, the MBR algorithm may determine that client 104 should request segments of the media presentation encoded at 2 Mbps. An MBR system may use the media presentation description to play a media presentation.

Differential Based Media Presentation Description

Figure 2:
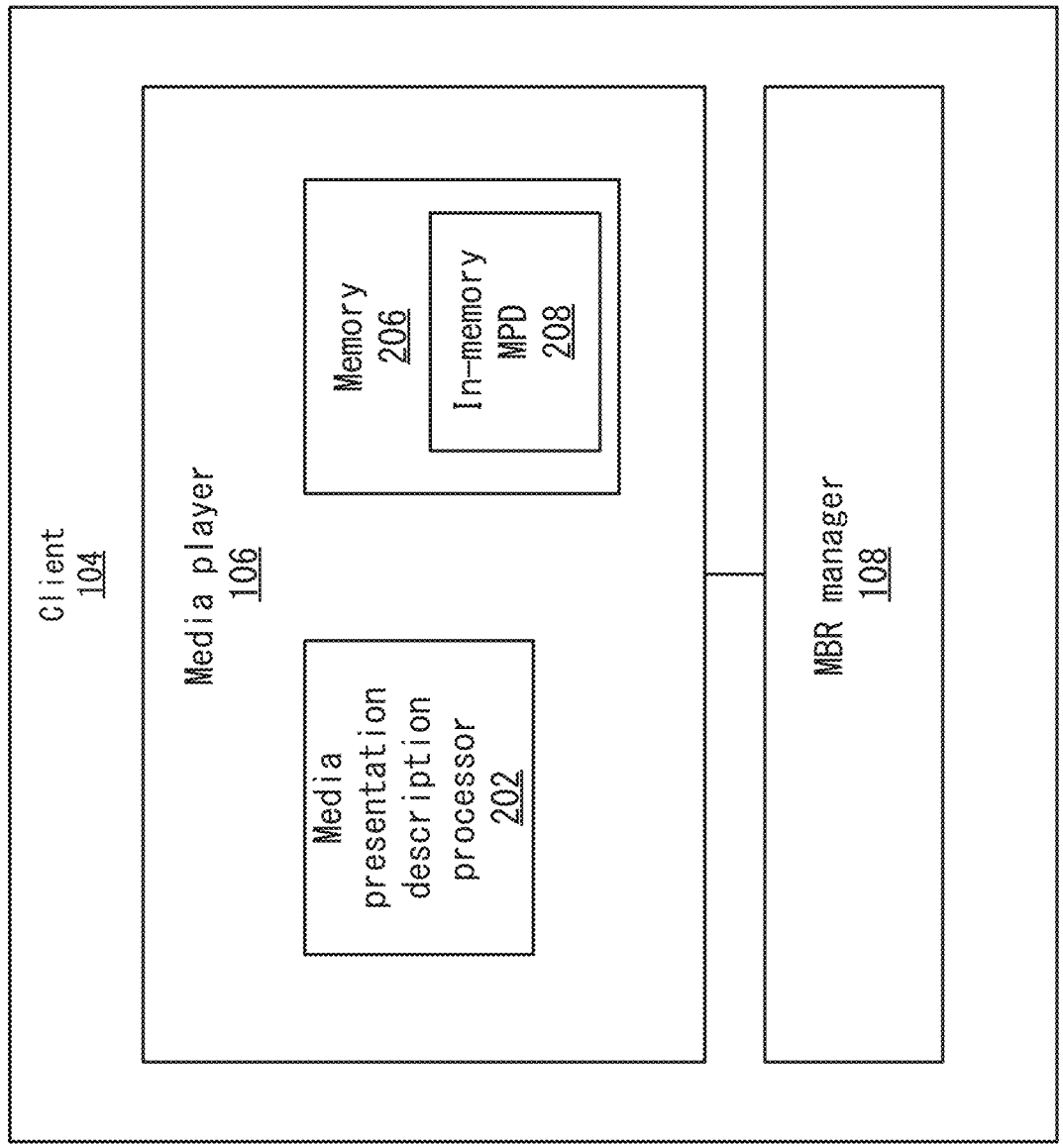
FIG. 2 depicts a more detailed example of a client according to some embodiments.

FIG. 2 depicts a more detailed example of client 104 according to some embodiments. A transport mechanism, such as a protocol specification including Dynamic Adaptive Streaming over HTTP (DASH), also known as MPEG-DASH, may be used to transport segments of a media presentation to client 104. However, HTTP Live Streaming (HLS) or other protocols may also be used. Client 104 may use a differential based media presentation description process to request segments of a media presentation. The use of differential based media presentation description allows the video delivery system to scale better, such as scaling of a live video service that offers a linear schedule of media presentations to users.

Client 104 may use two types of requests, join and patch. The join request may join a live stream for a media presentation. Also, a patch request may request a patch to a media presentation description. For example, a media presentation description processor 202 of client 104 requests patches to a media presentation description from server 102. Also, media presentation description processor 202 processes the patches and updates an in-memory media presentation description 208 in memory 206. Memory 206 may in local memory to client 104, but may also be memory attached to client 104. In-memory media presentation description 208 is the version of the media presentation description that client 104 stores in memory 206. In-memory media presentation description 208 includes a timeline of playback of the segments of the media presentation, and client 104 can keep any duration of in-memory media presentation description 208 in memory 206, keeping start over ability on programs of all durations for users. Continually extending the timelines of in-memory media presentation description 208 via patches allows client 104 to provide seamless rollover while decreasing the users' overall resource consumption because the updates do not include all the prior details of the already received segments. Seamless rollover is provided by client 104 managing the in-memory media presentation description 208. As time within the live stream advances past the logical media presentation boundary points, client 104 client can seamlessly play across multiple media presentations if client 104 has segments for both media presentations stored in in-memory media presentation description 208.

Server 102 provides an update for client 104 of segment information that is not already known. Status information is used to keep track of what information each different client 104 has received. For example, server 102 may insert status information in each communication (e.g., a patch) that is sent to client 104 that indicate what information a client 104 has already received. Client 104 may insert the status information in the next patch request to server 102. Then, server 102 uses status information to determine what information client 104 has already received from the media presentation description and then to select the information for the next patch update for client 104. Using the status information, server 102 provides a patching mechanism for updating in-memory media presentation description 208 on the client and server 102 keeps full control of the stream timeline construction.

The differential patch updates allow client 104 to request patches that are used to update in-memory media presentation description 208 rather than wholly replacing in-memory media presentation description 208. The patches may be used to perform actions, such as extending the timeline of in-memory media presentation description 208, introducing new periods in in-memory media presentation description 208, truncating/removing existing periods in the in-memory media presentation description 208, and/or introducing in-band stream events in in-memory media presentation description 208. A period may be some grouping of segments, where a live stream may have multiple periods. An in-band stream event may contain information about an advertisement that is inserted into the stream or may be other insertion content. A new period may be started for an ad insertion time period. The media presentation description may also be used to truncate the ad insertion period. Using the status information, server 102 can determine everything it has previously sent to each individual client. Server 102 may rely on clients 104 to assist in the persistence of their state, but server 102 may not rely on clients 104 performing manipulations on this state or to specifically manipulate update requests for the patches. Some embodiments place no further requirement on client 104 other than to insert the status information in a next patch request. This leaves the decision of what to include in the next patch to server 102.

Client 104 retains the full timeline of the media presentation description of the live stream in memory 206. The timeline contained within in-memory media presentation description 208 is a media presentation description that is referenced by client 104 to proceed with playback of the media presentation. For example, client 104 uses links in the in-memory media presentation description 208 to request segments of the media presentation. In-memory media presentation description 208 may be stored in different formats. For example, to allow for client efficiency, the in-memory media presentation description 208 need not be stored in full extensible markup language (XML) structure format, but stored such that all defined identifiers are preserved and usable for updating the in-memory media presentation description 208. For example, client 104 may know it is parsing a media presentation description and store the same structure information found in the media presentation description in efficiently packed data structures that are optimized to use less memory instead of using a full XML structure needed when an entire media presentation description is sent every time.

The patch updates optimally use bandwidth and reduce both server and client side processing. As all clients 104 that are up to date within a live stream share the same set of unknown information, the patch updates will be highly cacheable at server 102 (e.g., edge servers) for a majority of clients. The highly cacheable updates may mean that server 102 may cache the patches and send the same patches to multiple clients. For example, scaling to support thousands of simultaneous live presentations can, on its own, require substantial effort, as an average segment duration of four to ten seconds means the media presentation description is constantly regenerated. While a typical buffer depth of a few minutes can scale in this scenario, overlaying the full-fledged user, content, and legal requirements of a live presentation creates an excessive set of permutations, rendering most caching structures useless. To provide a somewhat scalable solution, server 102 may unify the client media presentation description consumption as much as possible, but the variances in device computational and memory capability meant that the lowest common denominator ended up driving stream complexity. Where more powerful client devices can easily handle multi-megabyte media presentation descriptions with over six hours of buffer depth, the lowest end client devices struggle with kilobyte media presentation descriptions containing under an hour of content. To provide features such as full program lookback for sporting events and fulfill contractual stream restriction requirements, the differential media presentation description may decouple the presentation scalability from device capability and stream stability.

Initial Media Presentation Description Processing

Figure 3:
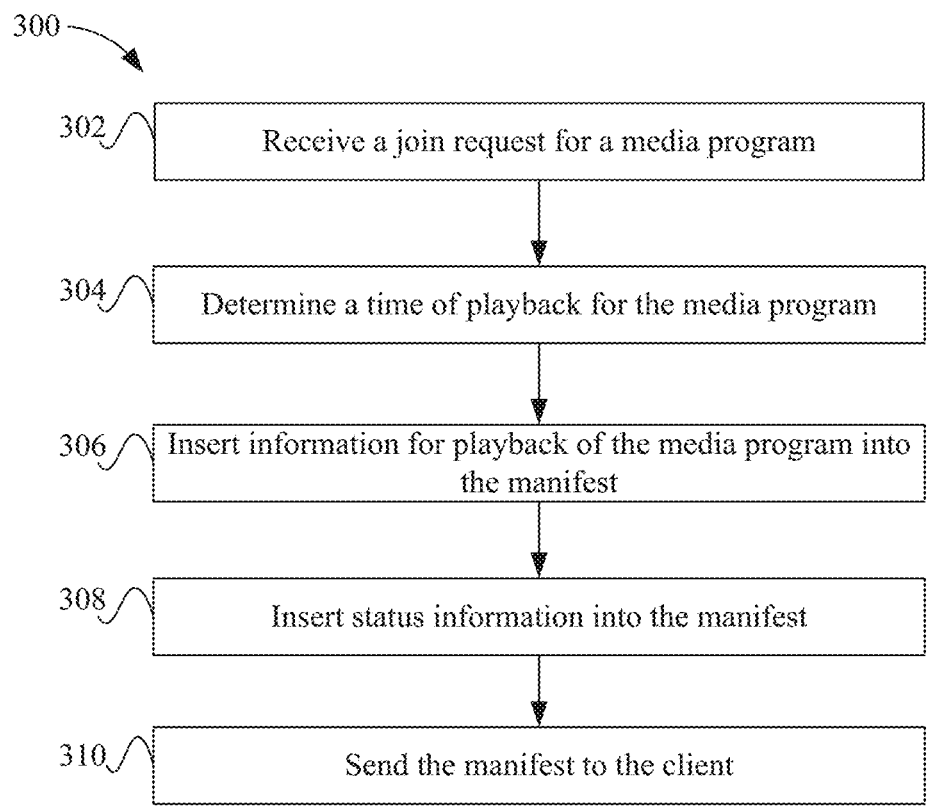
FIG. 3 depicts a simplified flowchart of a method for processing an initial join request for a media presentation according to some embodiments.

FIG. 3 depicts a simplified flowchart 300 of a method for processing an initial join request for a media presentation according to some embodiments. At 302, server 102 receives a join request for a media presentation. The join request is the first media presentation description request that client 104 issues. For example, client 104 may send a request for initial playback of a live stream of the media presentation. A user of client 104 may select the media presentation from a live service for playback on a user interface. When client 104 joins a live stream, client 104 will request everything from the start of the media presentation until the present time of playback of the media presentation from server 102. Also, the join request specifies that client 104 has the ability to process patches to the media presentation description (in contrast to the traditional method of receiving the entire media presentation description for each update). For example, clients 104 that support the patch process include a query parameter in the initial request that enables the use of patches.

At 304, server 102 determines a time of playback for the media presentation. The media presentation may have just begun playback and the time is the start of the media presentation when server 102 receives the request. However, server 102 may receive the request after the start of the media presentation and the time may be some time in the middle of the media presentation.

At 306, server 102 inserts segment information for the playback of the media presentation in the media presentation description. The media presentation description generated for this request contains all segment information from the start of the user's rights within the media presentation until the current time (e.g., the edge) of the live stream. Depending on how long a media presentation has been live there could be any number of content periods and ad periods within the live stream. Accordingly, the first instance of the media presentation description from server 102 may contain all segment information known from the requested start time. The first instance of sending the media presentation description is referred to as an initial media presentation description. The subsequent instances of the media presentation description may be referred to as patches or updates.

FIG. 4 depicts an example 400 of a media presentation description according to some embodiments. At 402, the media presentation description includes one period id of "foo-1". This period has two adaptation sets, one for video (id 1) at 404 and one for audio (id 2) at 406. A segment timeline is specified within each adaptation set that details the segment information for the representations. For example, the segment timeline may include segments from a time t=0 to a time t=60.

Referring back to FIG. 3, at 308, server 102 inserts status information into the media presentation description. For example, the status information may be a next location for a segment. In FIG. 4, at 408, server 102 has set a "Location" tag with status information, which is enough information to tell the server about the last information the client knows. In this example, the location includes an indication of a time t=70 to indicate the time for the next segment to request. In this case, client 104 has received a media presentation description up to segment t=60 (which lasts until t=70). The Location tag may describe the next request in the form of a uniform resource locator (URL) for client 104, but the exact form of this information may vary and this example is purely for illustrative purposes. For example, the Location tag may indicate that the segment at t=60 was just received. At 310, server 102 then sends the media presentation description to client 104. In another embodiment, client 104 may not announce it has the ability to process patches to the media presentation description and server 102 may still proactively provide the status information within a compatibility signaling descriptor that only compatible clients process, while incompatible clients perform normal polling and receive full media presentation descriptions.

Patch Processing

Figure 5:
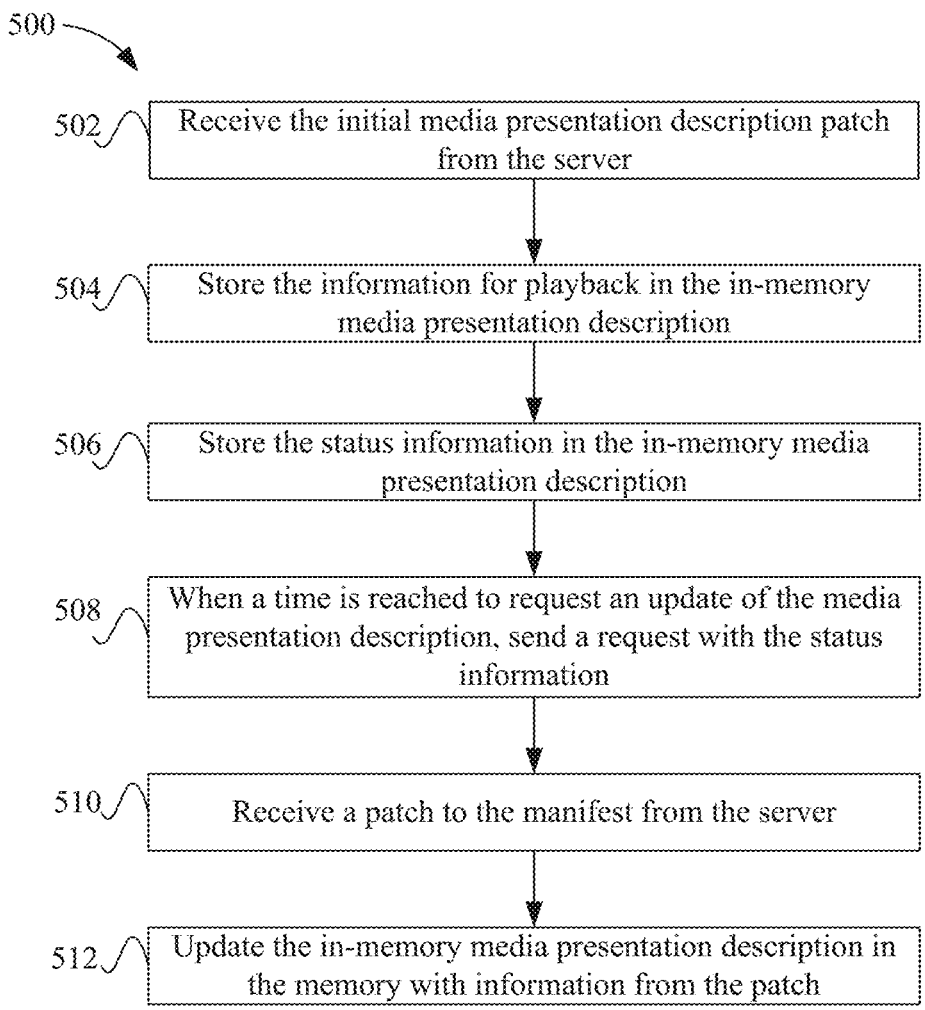
FIG. 5 depicts a simplified flowchart of a method for processing the instances of media presentation descriptions according to some embodiments.

Client 104 receives the patches to the media presentation description. FIG. 5 depicts a simplified flowchart 500 of a method for processing the instances of media presentation descriptions according to some embodiments. At 502, client 104 receives the initial media presentation description patch from server 102. The initial media presentation description patch may include information for one or more segments depending on the time that client 104 requested the live stream for the media presentation. At 504, client 104 stores information for the playback of the live stream in in-memory media presentation description 208 in memory 206. The information may include the period and adaptation sets from media presentation description 400. Also, at 506, client 104 stores the status information in in-memory media presentation description 208. The status information may be a link to the next patch.

At 508, when a time is reached to request an update of the media presentation description, client 104 sends a request with the status information. Client 104 may begin polling for updates based on an update period. If client 104 starts polling before the next segment is available, client 104 may receive a response indicating the next segment is not ready, such as a "204 No Content" response indicating content is unavailable. The "204 No Content" response indicates that the request is valid but based on the client's current timeline knowledge there is no additional content available at this time. Client 104 reacts to this status code by trying the query again at a later time, but no specification for time delay is given, because the original update period should already describe an update polling cadence.

At 510, client 104 receives a patch to the media presentation description from server 102. The patch includes an update to in-memory media presentation description 208. The patch may update different aspects of in-memory media presentation description 208, such as the patch may extend the timeline, create a new period, truncate or remove a period, or both create a new period and extend the timeline. At 512, client 104 then updates in-memory media presentation description 208 using the information in the patch.

Patch Examples

Different examples of patches will now be described. FIG. 6 depicts an example of a patch 600 that extends in-memory media presentation description 208 according to some embodiments. If a variable, such as a variable MPD@type, is set to 'dynamic' in the initial media presentation description patch (or the join request), an update to the media presentation may be presented to the client as a patch. At 602, a property descriptor, such as an essential property descriptor that is required in the patch, is inserted in the media presentation description that indicates this media presentation description is a patch. This essential property descriptor has an identifier of "@schemeIdUri" that may be equal to "urn:com:hulu:schema:mpd:patch:2017", but other schema may be used. The essential property descriptor may only be used when the timeline is set to use patch updates, such as the in-memory MPD@type is set to "dynamic". This essential property descriptor may not be present in the initial media presentation description shown in in FIG. 4 as the initial media presentation description must be a complete description. However, as a subsequent patch may not contain a syntactically complete media presentation description structure, the patch includes the property descriptor. Even though the patch does not contain the whole structure, the patch contains elements in their proper hierarchical structure to allow for unambiguous merging with the in-memory media presentation description 208. To ensure that merging is an unambiguous process, the patch provides identifying attributes for all hierarchical elements. A patch that does not meet this minimum requirement may be invalid. In some embodiments, server 102 may choose to serve the same initial media presentation description to both a regular client 104 (e.g., one does not use patches) and a patch enabled client 104. In this case, server 102 may enclose the patch location 408 with a supplemental property descriptor . This supplemental property descriptor has an identifier of "@schemeldUri" that may be equal to "urn:com:hulu:schema:mpd:patch:2017", but other schema may be used.

Client 104 may merge the patch update into in-memory media presentation description 208 using different methods. For example, client 104 recursively walks the elements in the patch structure, matching elements in the patch to elements in the in-memory media presentation description 208 using defined identifying attributes. The attributes may be information for an additional segment, a new period, etc. Should an element in the patch be equivalent to one in the in-memory media presentation description 208, client 104 applies the attributes from the patch element to the in-memory element and the child nodes are recursively merged. Any attributes that exist in both the in-memory media presentation description 208 and the patch take the value of the patch element. If the only child nodes that an element may contain are text nodes, client 104 takes the patch text nodes as replacements to the in-memory timeline text nodes. Should an element in the patch have no equivalent element within the in-memory media presentation description 208, client 104 considers it a new element and the sub-tree with the element as a root in the patch is placed in the appropriate hierarchy in the in-memory media presentation description 208 with no further walking required for that sub-tree. Should an element from the patch result in an invalid in-memory timeline structure, this merge and the rest of the patch sub-tree with that element as a root may be ignored by client 104.

In some embodiments, the process by which client 104 merges the patch into in-memory media presentation description 208 may be as follows:

The patch is recursively walked by client 104 using defined constraints and attributes to identify structures within the in-memory media presentation description 208 that are equivalent during the walk.

For any element of a first type, such as a xs:simpleType, in the patch, that has an equivalent element in the in-memory media presentation description 208, the element in the patch fully replaces the element in the in-memory media presentation description 208. The first type may be a single element.

For any element of a second type, such as a xs:complexType, in the patch, that has an equivalent element in the in-memory media presentation description 208, the attributes of the element in the patch are applied to the element in in-memory media presentation description 208, replacing any existing value, and any child sequences are merged with this process. The second type may be a parent element with child elements.

For any element in the patch that has no equivalent within the in-memory media presentation description 208, client 104 should append the sub-tree, which has said element as its root, to the in-memory media presentation description 208, based on the currently walked hierarchical structure and a defined ordering, with no further walking required for the sub-tree.

Should an element within the patch violate, or could cause the in-memory media presentation description 208 to violate, the structural requirements of the media presentation description process, the element and the sub-tree with that element as a root in the patch, should be ignored by client 104.

In some embodiments, examples of equivalence and sequence ordering include:

Equivalence for the Period, AdaptationSet, and Representation elements may be established by matching of the @id attribute. A Period is an element that contains multiple AdaptationSets and defines the portion of the media timeline the AdaptationSets make up. An AdaptationSet is an element that represents a singular elementary stream type (video, audio, text) that may have multiple representations that differ based on creation parameters (encoding bitrate, resolution, etc.). This element would contain all bitrate variants that are generated from the same source.

Equivalence and ordering for S elements can be established by a combination of the @t, @d, and @r attributes. This S element provides explicit information about a segment or set of segments within a Representation. The information it provides is used for addressing and accessing the segment.

Equivalence for elements with no identifying attributes, such as SegmentTimeline, is established by instance restrictions. This element contains all the possible S elements for the media presentation time represented by the SegmentTimeline and, per MPEG-DASH semantics, only one SegmentTimeline is allowed to exist for a given representation.

In the case of a new element that has no specification defined ordering, but may have multiple instances, the element is appended at the end of the matching hierarchical sequence. For example, a media presentation description element may contain multiple Period elements, but their ordering is dictated by parse order not by a defined ordering logic, thus new Periods are appended to the Period list.

In FIG. 6 at 604, the patch extends the in-memory media presentation description 208 by two segments for the video and by four segments for the audio at 606 according to some embodiments. The patch specifies the direct hierarchy with identifiers for the Period and AdaptationSets, then specifies a singular element of SegmentTemplate/SegmentTimeline with the information for the additional segments. For example, the Period id is "foo-1", which is the same in the initial media presentation description. When only one SegmentTemplate/SegmentTimeline is permitted directly underneath the AdaptationSet node, the merging is unambiguous and does not require explicit identifiers for those nodes. Client 104 appends the segments to the end of the in-memory segment list as their identifying start time values (e.g., using the identifier S@t) do not match any start times in the in-memory media presentation description. The AdaptationSets contain video segments for times t=70 and t=80 with a duration d=10 time units, and audio segments at t=70, t=75, t=80, and t=85, with a duration of d=5 time units.

At 608, the patch includes new status information, which is a location for the next patch. The location embeds the combined known information into the URL. For example, this URL contains the information about the final time (e.g., t=90) present in both video and audio timelines that server 102 will use to construct the next patch. That is, t=90 is the start time for the next segment.

Another patch example may add a new period. FIG. 7 depicts a patch 700 that extends the in-memory media presentation description 208 by providing a new period whose identifier does not match any period in the in-memory media presentation description 208 according to some embodiments. In this example, an attribute, such as a Period@start attribute, is provided to anchor the period in the media presentation timeline described by the in-memory media presentation description 208; alternatively, a Period@start could be omitted, causing the start to be implied by the summed durations of the proceeding periods. In this example, at 702, the period identifier is "foo-2", which is different from the prior period's identifier of "foo-1" and has a Period@start attribute of "PT70.0S". This starts a new period with new AdaptationSets at 704 and 706.

Additionally, the patch includes new status information at 708, which is a location for the next patch embedding the combined known information into the URL. The time has been changed to t=90 as this period starts at t=70 within the media timeline and 20 seconds of segments have been announced for the period, making the next segment time t=90.

Another example of a patch may also combine an extension of the segments in a period and also create a new period. FIG. 8 depicts a patch 800 that extends the in-memory media presentation description 208 for an existing period and also provides a new period according to some embodiments. Patch 800 updates the current period with additional segments at 802. This update is similar to the update in FIG. 6. Also, at 804, patch 800 defines a new period with new segments. This update is similar to the update in FIG. 7. Additionally, patch 800 includes new status information at 806, which is a location for the next patch embedding the combined known information into the URL. The time has been changed to t=90 as the existing period was extended by 10 seconds and the new period starts at t=80 and had 10 seconds of segments announced, making the next segment time t=90.

Examples

Figures 9, 10:
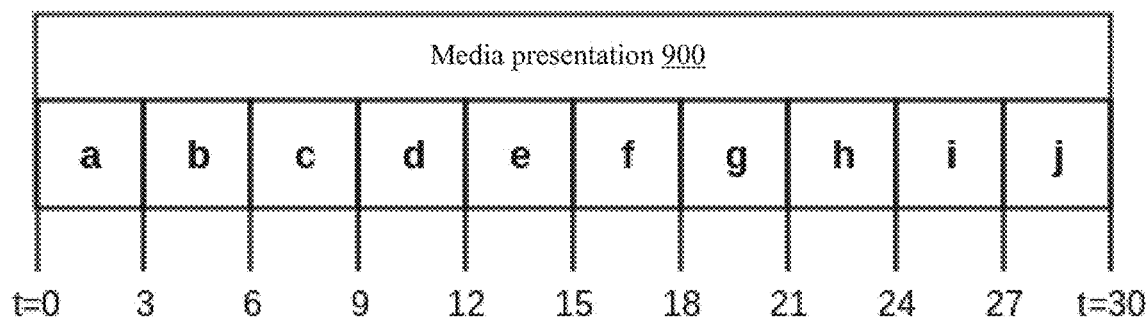
FIG. 9 depicts a media presentation according to some embodiments.
FIG. 10 depicts a call table that occurs according to some embodiments.

In the following example, client 104 is joining a live stream during a media presentation. FIG. 9 depicts a media presentation 900 according to some embodiments. The media presentation includes individual segments "a" to "j" that are three time units long and each segment is fixed at a specific time t and becomes available to clients after t+3 time units has passed. For example, segment d is fixed at t=9 and server 102 makes segment d available to client 104 at t=12 (e.g., when all the content for segment d is available). For the purposes of this example, assume the join request has a path that has a form similar to a URL link of: "https://livestream.company.com/dash/live/CTN.mpd". For simplicity the authentication and client capability query string components are omitted from the URLs, but other implementations may contain them.

When client 104 joins the live stream for this media presentation, server 102 sends the URL of "https://livestream.company.com/dash/live/CTN.mpd?start=0&supportspatching=true" to client 104. Client 104 can use the URL to initiate its playback of the media presentation. The URL identifies the live stream for the media presentation and indicates that client 104 supports the patch update process described herein.

Depending on the time t that the client joined the stream the client would receive a different number of segments and next location URL as follows. If client 104 joined at t=3, the resulting media presentation description would contain only segment a. The status information may be a next location URL of: https://livestream.company.com/dash/live/CTN.mpd?t=3. The insertion of time t=3 into the URL indicates to server 102 that client 104 has information in its in-memory media presentation description 208 up until time t=3. If client 104 joined at t=12, the resulting media presentation description would contain segments: a, b, c, and d. The status information may be a next location URL of: https://livestream.company.com/dash/live/CTN.mpd?t=12. The insertion of time t=12 into the URL indicates to server 102 that client 104 has information in its in-memory media presentation description 208 up until time t=12.

Client 104 would then begin polling for updates on the supplied next location URL using a period, such as the period specified by a parameter MPD@minimumUpdatePeriod. If client 104 polled before the next segment following the known time is available it will get a 204 response, otherwise the response is a patch containing any newly published segments and an updated next location in which to continue polling.

If client 104 joins at t=12 and polls at a three time unit cadence, FIG. 10 depicts a call table 1000 that occurs according to some embodiments. A first column 1002 indicates the time t at which the URL request is performed, a second column 1004 indicates the URL requested, a third column 1006 indicates the segments returned for the media presentation, and a fourth column 1008 indicates the next location URL. The first call is a join request and server 102 would retrieve and send segments a, b, c, and d to client 104. The status information may be a next location URL indicating that the location is t=12 as shown in column 1008 at 1010. After that, client 104 requests and receives segment e using the URL at 1010. The media presentation description does not include information for segments a, b, c, and d. The next location in the patch update would be a URL indicating that the location is t=15 at 1012. This process continues as client 104 requests and receives patches for segments f, g, h, i, and j along with next location URLs.

After the call at t=30, client 104 has received all segments of the program and stored the information for the segments in in-memory media presentation description 208. Now, if the user has the rights to do so, client 104 could seek anywhere in the media presentation. Seamless program rollover would be unchanged as client 104 can continue to expand the in-memory media presentation description 208 beyond the current media presentation by continuing to request patches for additional media presentations that occur after the end of this media presentation. For example, the next media presentation on the live stream may start and client 104 can request segments for that media presentation.

At some point client 104 may evict information from the in-memory media presentation description 208, such as due to environment constraints. Different mechanisms for this eviction can be used. For example, if there were no computational limits on client 104, it could theoretically persist all portions of the in-memory media presentation description 208 indefinitely, but in practice such persistence may be impractical due to rights restrictions and device memory limits. To ensure observation of any availability restrictions set forth and continued stability of client 104, client 104 may periodically evict information from the in-memory media presentation description 208.

Segment availability, as signaled by server 102 or another entity (e.g., an owner of the media presentation), may be used as a primary eviction indicator. If a segment becomes unavailable, client 104 may remove it from the in-memory media presentation description 208 as the segment is no longer useable for playback. A secondary eviction indicator may be the total size of the in-memory media presentation description 208. If client 104 detects that the size of the in-memory media presentation description 208 crosses a client specified threshold, client 104 may elect to remove segments from the beginning of the in-memory media presentation description 208 regardless of their availability to ensure client stability.

Should any segment be removed from the in-memory media presentation description 208, client 104 may update all information within the in-memory media presentation description 208 such that the remaining elements remain valid. If a segment removal results in an empty hierarchy, such as a Period with no segments, client 104 may also remove the entire hierarchy in the interest of memory management.

Cacheability

The URLs that client 104 uses to request manifests contain start times that are fixed at the initial program join time. This means there is a unique URL for every program that has started during a time period, such as in the last 24 hours, even though all clients 104 are discovering the same new information on each refresh. Clients 104 can receive the same known information as this means clients 104 may always be querying for the same new stream information. So, no matter how long a client 104 has been on a live stream, that client 104 can receive the same information updates of all other clients 104.

In one example, a first client 104 could have the call pattern depicted in FIG. 10. If a second client 104 joins at t=19 with a three time unit polling time, FIG. 11 depicts the second client's call table 1100 according to some embodiments. The first join request of second client 104 would retrieve segments a, b, c, d, e, and f. The next location in the media presentation description would be a URL indicating the location is t=18 at 1110. After that, second client 104 requests and receives segment g using the URL. The next location in the media presentation description would be a URL indicating that the location is t=21 at 1112. This process continues until second client 104 receives segment j.

After the initial join request, second client 104 shares the same known information as first client 104 (the client whose call pattern is shown in FIG. 10). For example, the second client 104 from that time onward queries for the same patches using the same URLs and is able to receive the same responses as first client 104. That is, both first client 104 and second client 104 send a request for segment g using the same next location URL. Because a segment cannot be available until the segment has completed publishing, a patch is a valid representation of new information until the next expected segment publish time and thus can be cached until that next expected time. For example, the patch may be cached at an edge server that responds to clients' requests.

Failure Recovery

The above examples assumed perfect client polling behavior, but in reality it is possible for client 104 to encounter errors during polling due to situations such as resource contention or network failure. In this case, server 102 returns the latest published information for the media presentation in the next request. Since client 104 is providing the context of what information in the media presentation description has been received and stored in the in-memory media presentation description 208, server 102 is able to fulfill a request after an error and send all the latest published information for the media presentation. FIG. 12 depicts a call table 1200 showing the failure recovery according to some embodiments. In this example, a third client 104 joins the live stream at a time t=19, and the third client 104 receives segments a, b, c, d, e, and f. But, a network error occurs at 1210 and third client 104 does not receive segment g. That is, the first patch request at a time t=22 fails due to network conditions and third client 104 may wait a full update period to try again (or may keep trying).

Once the full update period has passed, third client 104 sends the patch request that includes the time t=18. The t=18 manifest following the first failure has already expired at server 102 (or the edge cache) so server 102 generates a new patch with all the new segments that third client 104 does not have, which are segments g and h, and a next location that reflects the gained knowledge of these two segments of a time t=24. In this case, server 102 knows from the status of t=18 in the request that third client 104 includes segments up to segment f. Thus, server 102 can determine that third client 104 needs segments g and h. Then, at time t=28, third client 104 is back to sharing the update cache with the other clients at 1212 because the next request with the location t=24 is the same as other clients. Even if the edge cache of the patch request for time t=18 were to not expire in time, the next location request URL that server 102 embedded in the cached response still properly represents the next request that third client 104 must make, meaning that third client 104 will never be able to skip a patch and miss information about the media presentation description.

Backwards Compatibility

Due to the minimal information returned in a patch, the updates provided for clients 104 that understand the dynamic patching method may not be backwards compatible with clients 104 that do not use the dynamic patching method. To handle an environment with both types of clients, service providers may choose to either explicitly separate or share media presentation descriptions among these clients 104.

If a service provider wishes to provide explicitly separate media presentation descriptions, it may do so by providing clients 104 with initial media presentation description locations that signal the client compatibility. One form of this signal is an additional query string parameter, but a more complex form may entail different server paths or domain names.

If a service provider wishes to provide a shared media presentation description, it may signal the patch behavior within the original media presentation description and signals related to the media presentation description patch behavior may be wrapped with a Supplemental property element of SupplementalProperty with an identifier@schemeIdUri set to an attribute enabling the patching method, such as "urn:mpeg:dash:patch:2018". For instance, a media presentation description containing a Location element with a media presentation description patch location would be contained within an appropriate SupplementalProperty so that clients supporting this behavior will follow the Location element, while clients that do not will refresh from the initial location to receive a full media presentation description. One example of using the Supplemental property element is:

<SupplementalProperty schemeIdUri="urn:com:hulu:schema:mpd:2017:patch">
<Location>./live/channel.mpd?t=70</Location>
</SupplementalProperty>

Conclusion

Accordingly, the process enables clients 104 that are viewing a live stream for an arbitrary amount of time with: highly cacheable responses for the majority of clients, minimal processing on the server side, minimal parsing and processing on the client side, and optimal usage of data bandwidth.

Dynamic Supplemental Content Insertion

Dynamic content insertion allows the video delivery system to dynamically insert supplemental content into the live stream. The supplemental content may be content that is different from the media presentation currently being sent to client 104. In some examples, the supplemental content may be advertisements, but other supplemental content may be appreciated, such as content that recommends other media presentations being offered on the video delivery system, network identification bumpers, emergency alerts, breaking news alerts, stream source switches, and user choice based content replacement ("choose your own adventure" type content Dynamic content replacement may be the process of replacing default content that is inserted within the live stream with dynamically selected content. For example, a live stream may have default advertisements that are included in the live stream. Dynamically selected advertisements may replace the default advertisements. In some embodiments, dynamic content replacement may replace the default content with content that is targeted per user.

Some embodiments provide dynamic content replacement by forking or diverting the live stream to a supplemental content stream. The diverting may also include diverting from a media presentation server that is sending segments of the media presentation to a supplemental content server that sends the supplemental content. However, the diverting to a different server may not be needed. The system diverts the live stream using the status information provided in the media presentation description patches. The supplemental content stream can then send supplemental content to client 104 during a break in the media presentation, such as an ad break. When the break ends, client 104 is diverted back to the live stream to receive additional segments of the media presentation.

System

Figure 13:
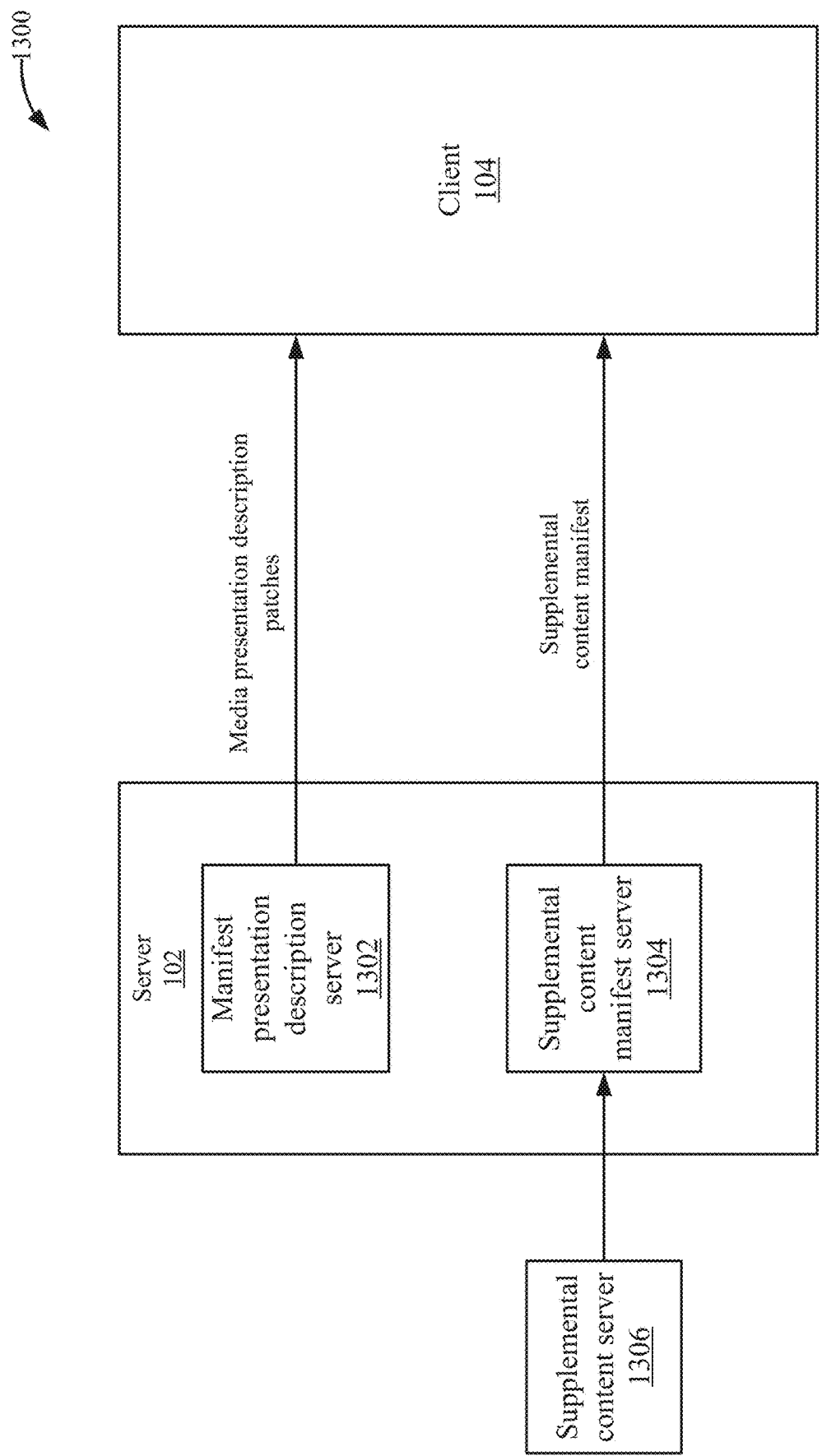
FIG. 13 depicts a simplified system 1300 of a method for performing dynamic content replacement according to some embodiments.

FIG. 13 depicts a simplified system 1300 of a method for performing dynamic content replacement according to some embodiments. Server 102 includes a manifest presentation description server 1302 and a supplemental content manifest server 1304. Manifest presentation description server 1302 may perform the functions described above with respect to receiving manifest presentation description patch requests and sending media presentation description patches. Then, supplemental content manifest server 1304 performs dynamic content replacement. In the process, supplemental content manifest server 1304 may communicate with a supplemental content server 1306 to determine supplemental content. A supplemental content manifest may identify supplemental content that can be dynamically inserted into the live stream to replace default content (e.g., default ads) in the live stream.

To perform conventional server-side dynamic content replacement, server 102 constructs media presentation descriptions at the same level of granularity as the determination of content for dynamic replacement, such as on a per-user basis. This requires per-user supplemental content manifests for the dynamic content replacement. Instead, dynamic content replacement can be performed by using the status information provided in the media presentation description patches to divert client 104 from the main live stream to a supplemental content stream for dynamic content replacement. Then, status information inserted in the supplemental content manifest is then used to divert client 104 back to the main live stream. Mechanisms at client 104 may be utilized to include client specific information in each request such that diversions to supplemental content may be unique per client/user while still allowing the main stream content to be shared among clients.

A break, such as an ad break, in a live stream may be identified by markers, such as Society of Cable Telecommunication Engineers (SCTE)-35 markers. The break may be inserted at a position in the media presentation for a certain duration. When a live stream approaches a break with a duration D, manifest presentation description server 1302 sends status information in the next manifest presentation description patch that includes a location for a supplemental content manifest that may be of the same duration D. The status information may also include another link that diverts the stream back to the live stream after the duration D.

The supplemental content manifest may be created by a different service, which requires the routing between manifest presentation description server 1302 and supplemental content manifest server 1304. Using the status information included in the media presentation description patches allows the diversion to supplemental content manifest server 1304 and then diversion back to manifest presentation description server 1302.

Timeline and Call Pattern

Figure 14A:
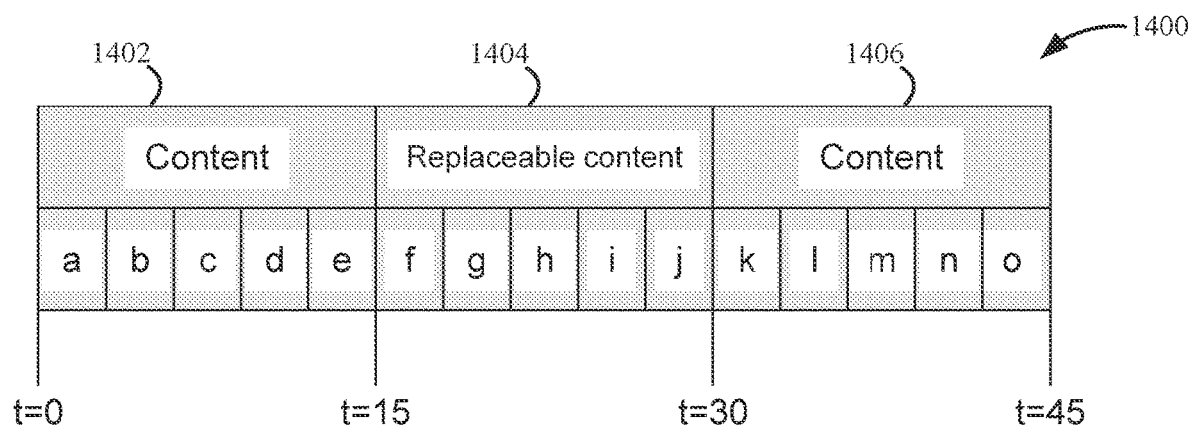
FIG. 14A depicts an example of a timeline for a media presentation with ad insertion according to some embodiments.

FIG. 14A depicts an example of a timeline 1400 for a media presentation with ad insertion according to some embodiments. At 1402, from t=0 to t=15, timeline 1400 includes content for the media presentation of segments a to e. Then, from time t=15 to t=30, replaceable content is included in the timeline at 1404. The replaceable content may have five segments f to j. Replaceable content may be content that is inserted in the live stream, but is eligible to be replaced on a per user basis by the video delivery system. After the replaceable content, at 1406, from time t=30 to t=45, the timeline includes content for the media presentation that continues for five segments of segment k to segment o.

Figure 14B:
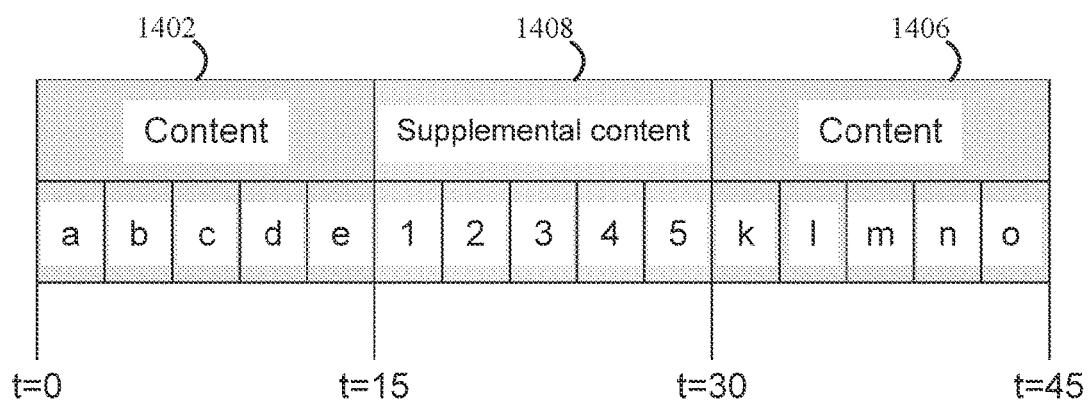
FIG. 14B shows an example of the dynamic content replacement according to some embodiments.

In some embodiments, the replaceable content at 1404 may be dynamically replaced with supplemental content. FIG. 14B shows an example of the dynamic content replacement according to some embodiments. At 1408, from time t=15 to t=30, supplemental content that is personalized to a user has dynamically replaced the replaceable content. The supplemental content may include five segments #1 to #5 that replace the five segments f to j of the replaceable content at 1404. This results in an exact replacement of the replaceable content.

FIG. 15 shows a table 1500 of a client query pattern according to some embodiments. Table 1500 includes a column 1502 that identifies the time in the media presentation, a column 1504 that identifies the link (e.g., URL) requested by client 104, a column 1506 that identifies the segments, a column 1508 that identifies the status information that is included in the response from server 102, and a column 1510 that indicates whether the response is cacheable or not. Table 1500 assumes there is a single endpoint for content and supplemental content. That is, there is no re-direction from manifest presentation description server 1302 to supplemental content manifest server 1304. Every client query may include a unique client identifier, but is omitted from the table.

At a time t=12, client 104 sends an initial request. That is, 12 seconds into the media presentation, client 104 sends the initial request. In response to the initial request, client 104 receives a manifest for segments a, b, c, and d. The status information in the manifest indicates that client 104 has received segments up to time t=12. At time t=15, client 104 sends a request for another manifest and receives a manifest presentation description patch for segment e. The status information in the manifest presentation description patch indicates that client 104 has received segments up to time t=15. The above responses are all cacheable as they are not specific to a user. For example, manifest presentation description server 1302 may remove any user specific information from the request sent by client 104 in the response. The user-specific information is not needed when not performing any content replacement.

At time t=18, client 104 sends a request for a supplemental content manifest. The query results in a manifest that can be used to load all the supplemental content segments for the estimated break of 15 seconds. A supplemental content manifest for supplemental content of segments 1, 2, 3, 4, and 5 is then sent to client 104. In the supplemental content manifest, client 104 receives status information indicating that client 104 has received content up to time t=30. That is, client 104 has received content up to the end of the break. The supplemental content manifest is personal to the user and is thus not cacheable. For example, the supplemental content manifest may include status information that includes an identifier personal to the user such that supplemental content can be personalized for that user.

At times t=21, t=24, t=27, and t=30, client 104 uses the status information with the time t=30 in it to request the next segment or segments manifest of the media presentation. Client 104 does not receive any segments because the actual playback of the timeline of the media presentation has not reached time t=30. In this example, client 104 may receive an error message of "204 no content", which is also cacheable.

At time t=33, client 104 sends a request for another manifest and receives a media presentation description patch for segment k. Segment k started at time t=30 and ends at time t=33. At that time, client 104 can request and receive segment k.

FIG. 16 depicts another table 1600 for a client query pattern in which different endpoints for the manifest presentation description and the supplemental content manifest are used according to some embodiments. At times t=12 and t=15, manifests for segments a, b, c, d, and e are requested as described above. At time t=18, client 104 sends a request for a supplemental content manifest and is returned a response that causes re-direction, such as a 302 re-direct, that re-directs client 104 to supplemental content manifest server 1304.

Supplemental content manifest server 1304 is told the duration of the supplemental content to serve (e.g., d=15) and the point in the main live stream to point back to using the status information, which indicates what content in the media presentation the client already has received is at a time t=30. The re-direct request is user specific and is not cacheable because the status information may include user specific information. This causes a second request at 1602 in which client 104 sends another request with the new status information to supplemental content manifest server 1304. In response, client 104 receives a supplemental content manifest for segments 1, 2, 3, 4, and 5. The supplemental content manifest also includes status information that re-directs client 104 back to the media presentation with an indication client 104 has received content up to a time t=30. Similar to above, at times t=21, t=24, t=27, and t=30, client 104 sends requests to manifest presentation server 1302 and eventually receives a media presentation description patch for segment k at time t=33.

The above is an illustrative way to perform the re-direction, but other methods may be appreciated. For example, manifest presentation description server 1302 may return a manifest presentation description patch that does not identify any segments, but includes new status information that points to the supplemental content manifest server 1304. This response may be cacheable as the user information is not needed because client 104 would insert the user specific information in a new ad request when it is sent. Also, manifest presentation description server 1302 may pre-emptively include the status information for the dynamic content replacement re-direct if the information is known ahead of time. Also, re-routing can be performed at server 102 without client 104 knowing.

Figure 17:
FIG. 17 depicts a table showing the client query pattern for the delivery of supplemental content segments one-by-one according to some embodiments.

Instead of providing the entire dynamically replaced supplemental content up front, supplemental content segments could be provided to client 104 one at a time or in smaller portions. FIG. 17 depicts a table 1700 showing the client query pattern for the delivery of supplemental content segments one-by-one according to some embodiments. At time t=18, client 104 receives status information that can be used to request one segment of the supplemental content. Then, after sending the request for a manifest associated with one supplemental content segment, client 104 receives additional information indicating the progress of what the client knows already, which is time t=3 of the break. Then, at t=21, client 104 sends a request using the status information and receives a supplemental content manifest for segment #2 and status information that includes the time t=6 of the break. This process continues as client 104 continually receives status information indicating an additional segment has been received, and then can use that information to request the next segment until time t=12 of the break is reached and the manifest for supplemental content segment #5 has been received. At this point, the timeline of the media presentation has reached time t=30 and client 104 receives status information indicating a time t=30 for the media presentation. This re-directs client 104 back to the media presentation stream. At t=33, client 104 sends a request and receives a manifest for segment k.

The break may also be cut short at some point and client 104 re-directed back to the main live stream. FIG. 18A shows a timeline 1800 for cutting the break short according to some embodiments. The break may have been five supplemental content segments as discussed above from time t=15 to time t=30. However, at 1802, in the following call pattern, time t=30, client 104 sends a request for an additional manifest and receives the manifest for segment j. Segment 5 may have been received, but the break was cut off by one segment and segment 5 is not played.

FIG. 18B depicts table 1810 for a client query pattern in which a supplemental content break is cut short according to some embodiments. At time t=18 client 104 receives a manifest that includes status information that includes a break identifier that indicates the break includes segments 1, 2, 3, 4, and 5. Client 104 sends requests for these supplemental content segments at time t=18 and receives segments 1, 2, 3, 4, and 5. At time t=30, the status information with the break identifier is used to determine the break is cut off because the status information indicates that client 104 has already received content up to time t=30. Client 104 receives a manifest for segment j, which is available at a time t=30. At time t=33, client 104 receives a manifest for segment k.

Figure 19:
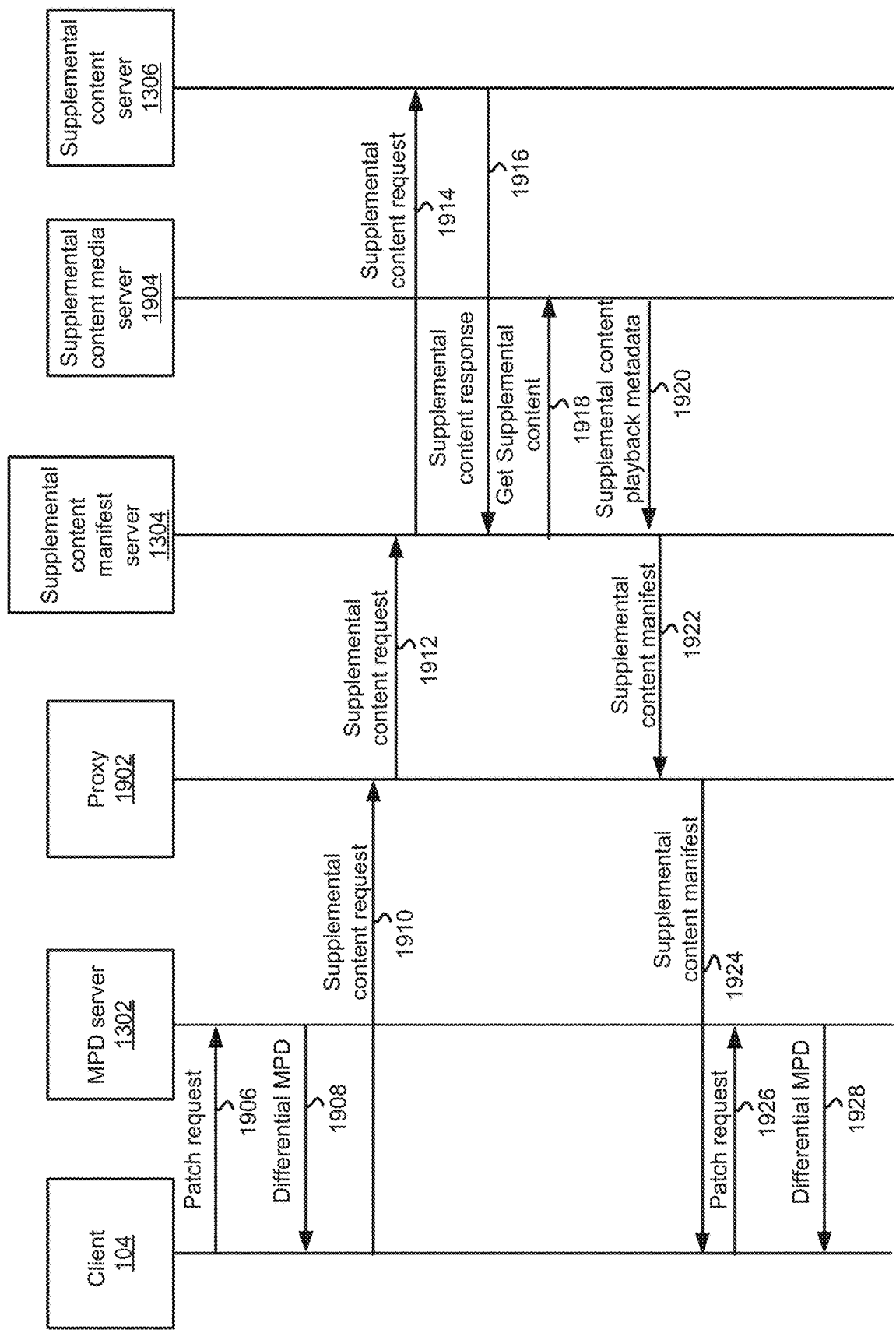
FIG. 19 depicts a call flow between various entities to perform dynamic content replacement according to some embodiments.

FIG. 19 depicts a call flow between various entities to perform dynamic content replacement according to some embodiments. In FIG. 19, client 104, manifest presentation description server 1302, and supplemental content manifest server 1304 are provided along with a proxy 1902, and a supplemental content media server 1904. It is noted that other configurations for performing dynamic content placement may be used. For example, proxy 1902 may not be used. Proxy 1902 may be a proxy service between client 104 and supplemental content manifest server 1304 and may proxy communications between client 104 and supplemental content manifest server 1304. Supplemental content media server 1904 may provide information on supplemental content that is selected by supplemental content server 1306.

When client 104 sends the initial request for the live stream, manifest presentation description server 1302 may communicate with supplemental content server 1306 to generate a supplemental content session identifier, which may be a unique identifier for the user. The supplemental content session identifier may be added in the status information that is sent to client 104. Then, client 104 may add the supplemental content session identifier in requests when dynamic content replacement is desired. Also, client 104 may add the supplemental content session identifier in all requests but when not performing dynamic ad replacement, manifest presentation description server 1302 removes the session identifier in any response. FIG. 20 depicts an initial manifest according to some embodiments. This initial manifest may provide an initial 70 seconds of content for the media presentation. At 2002, a property "ExtUrlQueryInfo" is provided that causes client 104 to include a supplemental content session identifier that is unique to the user in each request. Manifest 2000 also includes status information at 2004 that indicates client 104 has received information up to time t=70 in the media presentation.

Referring back to FIG. 19, at 1906, client 104 sends a patch request for the media presentation. Patch requests include status information received from a previous differential media presentation description. Then, at 1908, manifest presentation description server 1302 sends the differential media presentation description patch. This process is similar to the process described above. However, instead of inserting status information that allows manifest presentation description server 1302 to determine the next segment in the media presentation, manifest presentation description server 1302 inserts status information that allows dynamic content insertion. FIG. 21 depicts an example of a patch that directs to dynamic content replacement according to some embodiments. At 2102, the status information re-directs the live stream to a supplemental content stream for dynamic content replacement. The supplemental content opportunity is identified by an identifier of "abc" and is a duration d=60. This is a 60-second break that could include multiple pieces of supplemental content. The expected rejoin time is indicated as "rt=130". This is at time t=130 in the timeline for the live stream.

Client 104 uses the status information to send a request for dynamic content replacement. Referring back to FIG. 19, at 1910, client 104 uses the status information, which may be a link or URL to send a supplemental content request to proxy 1902. Accordingly, instead of sending requests to manifest presentation description server 1302, client 104 is re-directed by the status information to send a supplemental content request to proxy 1902. The status information in the media presentation description patch may include the re-direct request for the supplemental content request in addition to information (e.g., a link) that is used to return to the live stream. The link to return to the live stream will be described later on in the process.

At 1912, proxy 1902 sends the supplemental content request for a manifest to supplemental content manifest server 1304. When supplemental content manifest server 1304 receives the supplemental content request for the manifest, supplemental content manifest server 1304 forwards the supplemental content request for the manifest to supplemental content server 1306 at 1914. In some embodiments, the supplemental content request at 1912 may be for a dynamic content replacement and include the supplemental content session identifier and duration. The supplemental content session identifier may identify a specific user (e.g., client 104 or a user). The request at 1914 may be a request to determine the supplemental content for the supplemental content session identifier and a duration.

At 1916, supplemental content server 1306 selects supplemental content to include in the dynamic content replacement and sends the information that identifies the supplemental content in a response.

At 1918, supplemental content manifest server 1304 sends a request for the supplemental content to supplemental content media server 1904. At 1920, supplemental content media server 1904 returns supplemental content playback metadata. The supplemental content playback metadata may identify links to locations in which the supplemental content selected by supplemental content server 1306 can be retrieved. At 1922, supplemental content manifest server 1304 generates a supplemental content manifest. The supplemental content manifest may include information on how client 104 can retrieve the supplemental content during the break. For example, supplemental content manifest server 1304 may insert links for the supplemental content in the supplemental content manifest. Additionally, supplemental content manifest server 1304 may insert status information that allows client 104 to revert back to the live stream. In some embodiments, the original status information in the differential manifest presentation description at 1908 included a link back to the live stream that is embedded in the supplemental content request link and can be used as the new status information in the supplemental content manifest.

Proxy 1902 then sends the supplemental content manifest to client 104 at 1924. FIG. 22 depicts an example of an supplemental content manifest 2200 according to some embodiments. Supplemental content manifest 2200 includes status information at 2202 that indicates that client 104 has received content up to a time t=130. Supplemental content manifest 2200 also includes the information for the supplemental content segments. For example, at 2204, information for supplemental content A is shown. This includes supplemental content from a time t=0 to a time t=15 in the break and includes both video and audio. At 2206, the information for supplemental content B, C, and D are also shown without showing the adaptation sets.

Referring back to FIG. 19, client 104 may then request supplemental content using the link to the supplemental content in the supplemental content manifest. Once the break ends, client 104 may use the status information to revert back to the live stream. For example, client 104 sends a patch request using the status information to manifest presentation description server 1302 at 1926. Then, manifest presentation description server 1302 may generate a differential manifest presentation description for the live stream at 1928. FIG. 23 depicts a patch that is returned to client 104 after the break according to some embodiments. At 2302, status information indicating client 104 has received information up to time t=140 is provided. Manifest 2300 also includes information for the next segment, such as segment k, but not information from prior segments of the live stream or the break.

In some cases, the ad break may be terminated early. To handle an early ad break termination, FIG. 24 depicts an example of a differential manifest presentation description patch 2200 that cuts the previously provided break short according to some embodiments. Manifest 2400 indicates that an early cutback time happened 20 seconds into the announced break by including information about the main live stream restarting at t=90 as represented by the start of Period "foo-2". As the previous patch 2200 provided four 15-second supplemental content insertions, but the early cutback happened 20 seconds into the break, the result of the client 104 consuming the early cutback patch 2400 is that Period "ad-3" and "ad-4" are completely removed from memory while Period "ad-2" is cut to 5 seconds in length, with the new Period "foo-2" following it. The merged timeline on the client now has a known time of t=100, thus the early cutback manifest presentation description 2400 includes status information at 2402 that indicates the clients updated timeline.

Conclusion

Accordingly, some embodiments use differential manifest presentation descriptions to divert client 104 for dynamic content replacement in breaks that are found in the live stream. The use of status information allows the diversion from the live stream to the dynamic content replacement service, and then back to the live stream. The inclusion of the link back to the live stream in the request link also allows the reversion while not having any entity in the system having to recall the state of client 104.

Also, cacheability for the dynamic insertion of the supplemental content may be provided by having proxy 1902 omit the supplemental content session identifier included in the patch request by client 104 and in the differential media presentation descriptions. All clients 104 send unique manifest requests but receive generic responses when dynamic content replacement is not occurring. The status information included in a differential media presentation description may omit the session identifier which makes it non-client specific, and can be cached. However, client 104 may insert the supplemental content session identifier in any patch requests.

System

Figure 25:
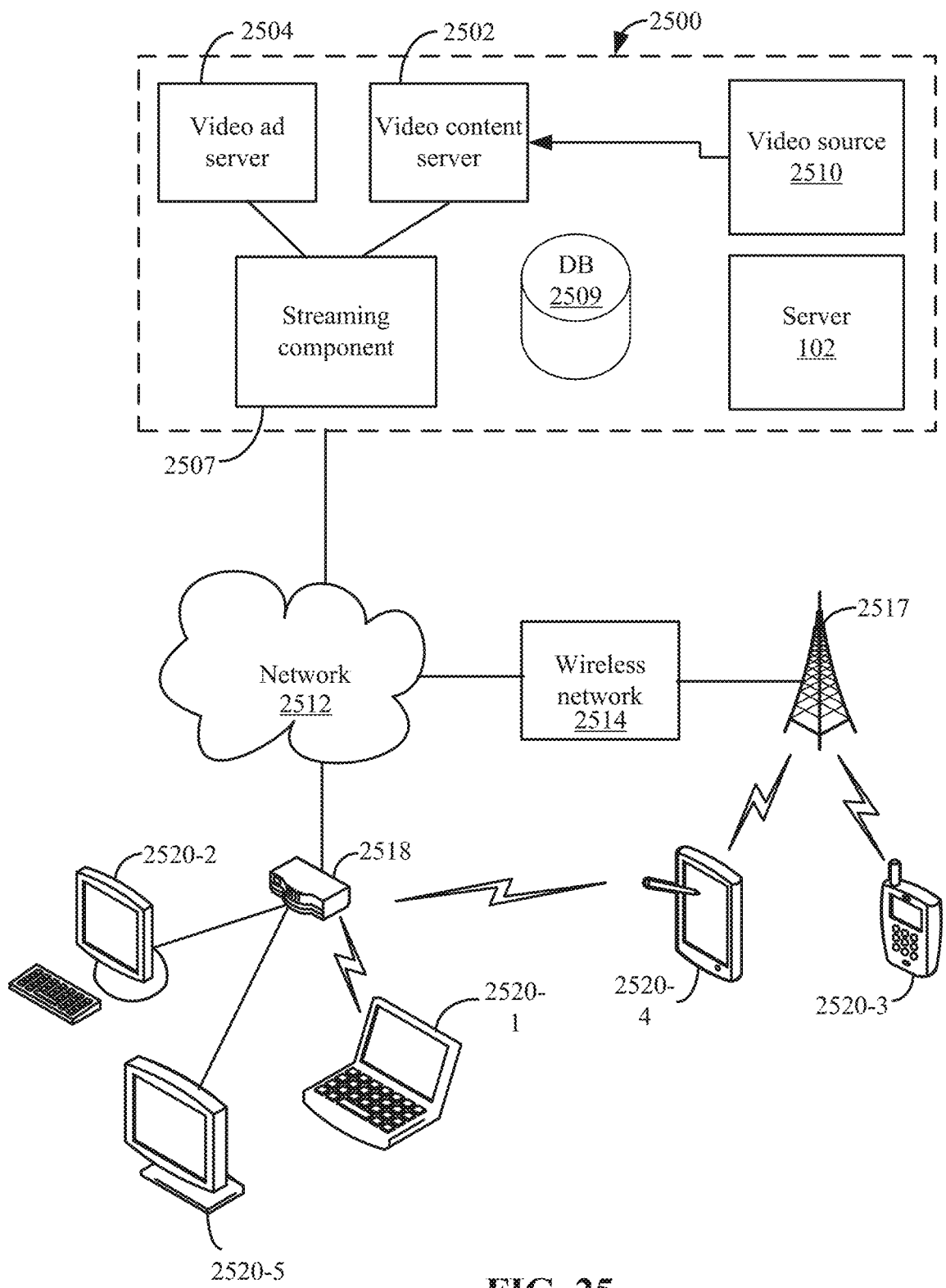
FIG. 25 depicts a video streaming system in communication with multiple client devices via one or more communication networks according to one embodiment.

Features and aspects as disclosed herein may be implemented in conjunction with a video streaming system 2500 in communication with multiple client devices via one or more communication networks as shown in FIG. 25. Aspects of the video streaming system 2500 are described merely to provide an example of an application for enabling distribution and delivery of content prepared according to the present disclosure. It should be appreciated that the present technology is not limited to streaming video applications and may be adapted for other applications and delivery mechanisms.

The video streaming system 2500 may include one or more computer servers or modules 2502, 2504, and/or 2507 distributed over one or more computers. Each server 2502, 2504, 2507 may include, or may be operatively coupled to, one or more data stores 2509, for example databases, indexes, files, or other data structures. A video content server 2502 may access a data store (not shown) of various video segments. The video content server 2502 may serve the video segments as directed by a user interface controller communicating with a client device. As used herein, a video segment refers to a definite portion of frame-based video data, such as may be used in a streaming video session to view a television episode, motion picture, recorded live performance, or other video content.

In some embodiments, a video advertising server 2504 may access a data store of relatively short videos (e.g., 10 second, 30 second, or 60 second video advertisements) configured as advertising for a particular advertiser or message. The advertising may be provided for an advertiser in exchange for payment of some kind or may comprise a promotional message for the system 2500, a public service message, or some other information. The video advertising server 2504 may serve the video advertising segments as directed by a user interface controller (not shown).

The video streaming system 2500 also may include server 102.

The video streaming system 2500 may further include an integration and streaming component 2507 that integrates video content and video advertising into a streaming video segment. For example, streaming component 2507 may be a content server or streaming media server. A controller (not shown) may determine the selection or configuration of advertising in the streaming video based on any suitable algorithm or process. The video streaming system 2500 may include other modules or units not depicted in FIG. 25, for example, administrative servers, commerce servers, network infrastructure, advertising selection engines, and so forth.

The video streaming system 2500 may connect to a data communication network 2512. A data communication network 2512 may comprise a local area network (LAN), a wide area network (WAN), for example, the Internet, a telephone network, a wireless cellular telecommunications network (WCS) 2514, or some combination of these or similar networks.

One or more client devices 2520 may be in communication with the video streaming system 2500, via the data communication network 2512, wireless cellular telecommunications network 2514, and/or another network. Such client devices may include, for example, one or more laptop computers 2520-1, desktop computers 2520-2, "smart" mobile phones 2520-3, tablet devices 2520-4, network-enabled televisions 2520-5, or combinations thereof, via a router 2518 for a LAN, via a base station 2517 for a wireless cellular telecommunications network 2514, or via some other connection. In operation, such client devices 2520 may send and receive data or instructions to the system 2500, in response to user input received from user input devices or other input. In response, the system 2500 may serve video segments and metadata from the data store 2509 responsive to selection of media programs to the client devices 2520. Client devices 2520 may output the video content from the streaming video segment in a media player using a display screen, projector, or other video output device, and receive user input for interacting with the video content.

Distribution of audio-video data may be implemented from streaming component 2507 to remote client devices over computer networks, telecommunications networks, and combinations of such networks, using various methods, for example streaming. In streaming, a content server streams audio-video data continuously to a media player component operating at least partly on the client device, which may play the audio-video data concurrently with receiving the streaming data from the server. Although streaming is discussed, other methods of delivery may be used. The media player component may initiate play of the video data immediately after receiving an initial portion of the data from the content provider. Traditional streaming techniques use a single provider delivering a stream of data to a set of end users. High bandwidth and processing power may be required to deliver a single stream to a large audience, and the required bandwidth of the provider may increase as the number of end users increases.

Streaming media can be delivered on-demand or live. Streaming enables immediate playback at any point within the file. End-users may skip through the media file to start playback or change playback to any point in the media file. Hence, the end-user does not need to wait for the file to progressively download. Typically, streaming media is delivered from a few dedicated servers having high bandwidth capabilities via a specialized device that accepts requests for video files, and with information about the format, bandwidth and structure of those files, delivers just the amount of data necessary to play the video, at the rate needed to play it. Streaming media servers may also account for the transmission bandwidth and capabilities of the media player on the destination client. Streaming component 2507 may communicate with client device 2520 using control messages and data messages to adjust to changing network conditions as the video is played. These control messages can include commands for enabling control functions such as fast forward, fast reverse, pausing, or seeking to a particular part of the file at the client.

Since streaming component 2507 transmits video data only as needed and at the rate that is needed, precise control over the number of streams served can be maintained. The viewer will not be able to view high data rate videos over a lower data rate transmission medium. However, streaming media servers (1) provide users random access to the video file, (2) allow monitoring of who is viewing what video programs and how long they are watched (3) use transmission bandwidth more efficiently, since only the amount of data required to support the viewing experience is transmitted, and (4) the video file is not stored in the viewer's computer, but discarded by the media player, thus allowing more control over the content.

Streaming component 2507 may use TCP-based protocols, such as HTTP and Real Time Messaging Protocol (RTMP). Streaming component 2507 can also deliver live webcasts and can multicast, which allows more than one client to tune into a single stream, thus saving bandwidth. Streaming media players may not rely on buffering the whole video to provide random access to any point in the media program. Instead, this is accomplished through the use of control messages transmitted from the media player to the streaming media server. Other protocols used for streaming are Hypertext Transfer Protocol (HTTP) live streaming (HLS) or Dynamic Adaptive Streaming over HTTP (DASH). The HLS and DASH protocols deliver video over HTTP via a playlist of small segments that are made available in a variety of bitrates typically from one or more content delivery networks (CDNs). This allows a media player to switch both bitrates and content sources on a segment-by-segment basis. The switching helps compensate for network bandwidth variances and also infrastructure failures that may occur during playback of the video.

The delivery of video content by streaming may be accomplished under a variety of models. In one model, the user pays for the viewing of video programs, for example, paying a fee for access to the library of media programs or a portion of restricted media programs, or using a pay-per-view service. In another model widely adopted by broadcast television shortly after its inception, sponsors pay for the presentation of the media program in exchange for the right to present advertisements during or adjacent to the presentation of the program. In some models, advertisements are inserted at predetermined times in a video program, which times may be referred to as "ad slots" or "ad breaks." With streaming video, the media player may be configured so that the client device cannot play the video without also playing predetermined advertisements during the designated ad slots.

Figure 26:
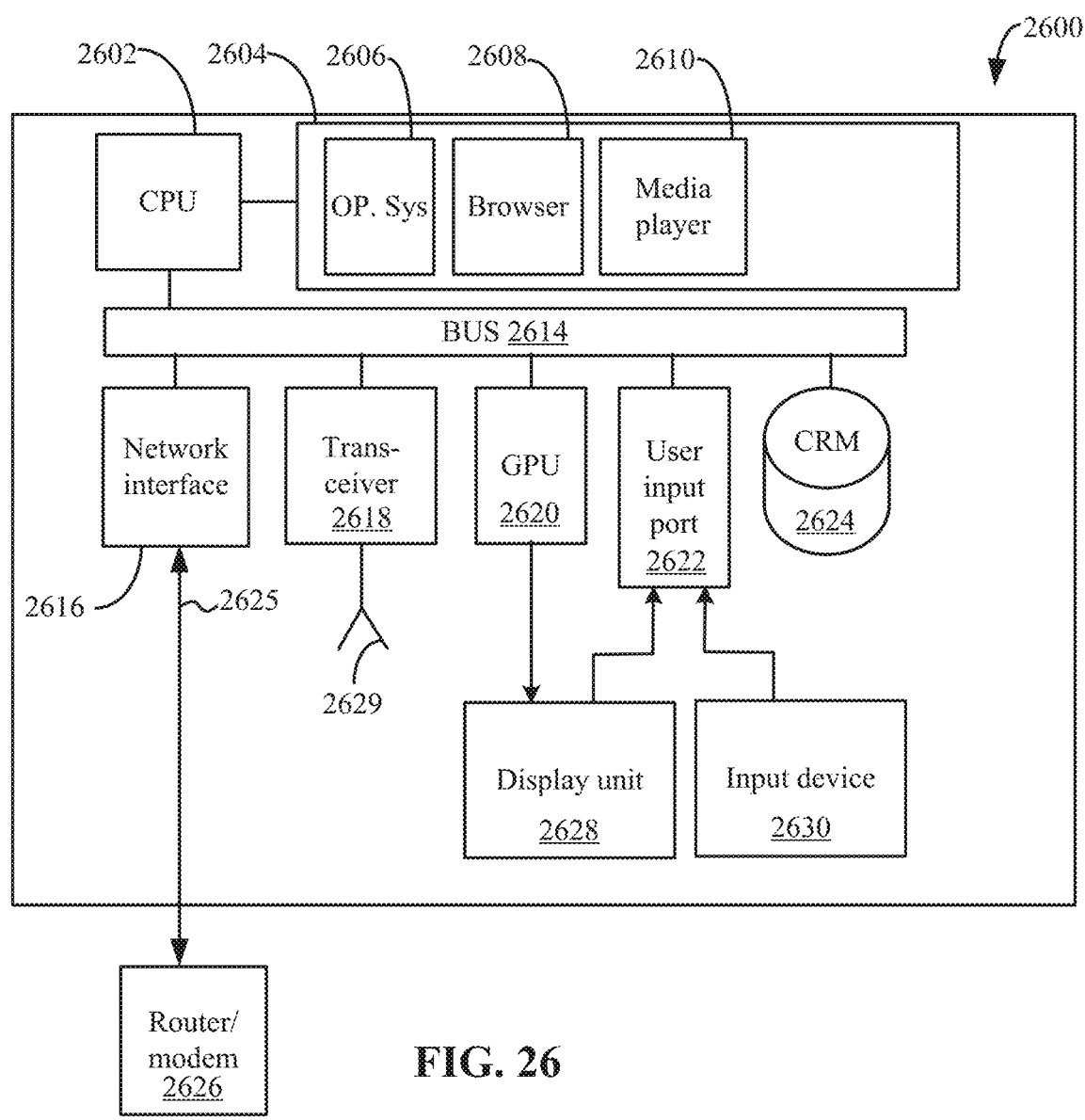
FIG. 26 depicts a diagrammatic view of an apparatus for viewing video content and advertisements.

Referring to FIG. 26, a diagrammatic view of an apparatus 2600 for viewing video content and advertisements is illustrated. In selected embodiments, the apparatus 2600 may include a processor (CPU) 2602 operatively coupled to a processor memory 2604, which holds binary-coded functional modules for execution by the processor 2602. Such functional modules may include an operating system 2606 for handling system functions such as input/output and memory access, a browser 2608 to display web pages, and media player 2610 for playing video. The memory 2604 may hold additional modules not shown in FIG. 26, for example modules for performing other operations described elsewhere herein.

A bus 2614 or other communication component may support communication of information within the apparatus 2600. The processor 2602 may be a specialized or dedicated microprocessor configured to perform particular tasks in accordance with the features and aspects disclosed herein by executing machine-readable software code defining the particular tasks.

Processor memory 2604 (e.g., random access memory (RAM) or other dynamic storage device) may be connected to the bus 2626 or directly to the processor 2602, and store information and instructions to be executed by a processor 2602. The memory 2604 may also store temporary variables or other intermediate information during execution of such instructions.

A computer-readable medium in a storage device 2624 may be connected to the bus 2626 and store static information and instructions for the processor 2602; for example, the storage device (CRM) 2624 may store the modules 2606, 2608, and 2610 when the apparatus 2600 is powered off, from which the modules may be loaded into the processor memory 2604 when the apparatus 2600 is powered up. The storage device 2624 may include a non-transitory computer-readable storage medium holding information, instructions, or some combination thereof, for example instructions that when executed by the processor 2602, cause the apparatus 2600 to be configured to perform one or more operations of a method as described herein.

A communication interface 2616 may also be connected to the bus 2626. The communication interface 2616 may provide or support two-way data communication between the apparatus 2600 and one or more external devices, e.g., the streaming system 2500, optionally via a router/modem 2626 and a wired or wireless connection. In the alternative, or in addition, the apparatus 2600 may include a transceiver 2618 connected to an antenna 2629, through which the apparatus 2600 may communicate wirelessly with a base station for a wireless communication system or with the router/modem 2626. In the alternative, the apparatus 2600 may communicate with a video streaming system 2500 via a local area network, virtual private network, or other network. In another alternative, the apparatus 2600 may be incorporated as a module or component of the system 2500 and communicate with other components via the bus 2626 or by some other modality.

The apparatus 2600 may be connected (e.g., via the bus 2626 and graphics processing unit 2620) to a display unit 2628. A display 2628 may include any suitable configuration for displaying information to an operator of the apparatus 2600. For example, a display 2628 may include or utilize a liquid crystal display (LCD), touchscreen LCD (e.g., capacitive display), light emitting diode (LED) display, projector, or other display device to present information to a user of the apparatus 2600 in a visual display.

One or more input devices 2630 (e.g., an alphanumeric keyboard, microphone, keypad, remote controller, game controller, camera or camera array) may be connected to the bus 2626 via a user input port 2622 to communicate information and commands to the apparatus 2600. In selected embodiments, an input device 2630 may provide or support control over the positioning of a cursor. Such a cursor control device, also called a pointing device, may be configured as a mouse, a trackball, a track pad, touch screen, cursor direction keys or other device for receiving or tracking physical movement and translating the movement into electrical signals indicating cursor movement. The cursor control device may be incorporated into the display unit 2628, for example using a touch sensitive screen. A cursor control device may communicate direction information and command selections to the processor 2602 and control cursor movement on the display 2628. A cursor control device may have two or more degrees of freedom, for example allowing the device to specify cursor positions in a plane or three-dimensional space.

Some embodiments may be implemented in a non-transitory computer-readable storage medium for use by or in connection with the instruction execution system, apparatus, system, or machine. The computer-readable storage medium contains instructions for controlling a computer system to perform a method described by some embodiments. The computer system may include one or more computing devices. The instructions, when executed by one or more computer processors, may be configured to perform that which is described in some embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of some embodiments may be implemented. The above examples and embodiments should not be deemed to be the only embodiments and are presented to illustrate the flexibility and advantages of some embodiments as defined by the following claims. Based on the above disclosure and the following claims, other arrangements, embodiments, implementations and equivalents may be employed without departing from the scope hereof as defined by the claims.

What is claimed is:

1. A method comprising:
   receiving, by a computing device, a request from a client device, the request including location information for an update to a media presentation description for a media presentation;
   using, by the computing device, the location information to determine that the client device has not received a first segment based on the location information, wherein the media presentation description is currently sending updates for a second segment;
   using, by the computing device, the location information to identify that the update to the media presentation description should include the first segment and the second segment; and
   sending, by the computing device, an instance of the media presentation description that includes update information for the first segment and the second segment to update a stored version of the media presentation description for the client device.

2. The method of claim 1, wherein the instance of the media presentation description comprises a first instance of the media presentation description, the method further comprising:
   prior to receiving the location information, sending a second instance of the media presentation description to the client device, the second instance of the media presentation description including the location information.

3. The method of claim 2, wherein:
   the second instance of the media presentation description includes update information for a third segment, and
   the third segment is found before the first segment and the second segment in the media presentation.

4. The method of claim 1, wherein the instance of the media presentation description comprises a first instance of the media presentation description, the method further comprising:
   prior to receiving the location information, sending a second instance of a media presentation description to the client device, the second instance of the media presentation description including update information for a set of segments that are before the first segment of the media presentation.

5. The method of claim 4, further comprising:
   receiving a join request to join playback of the media presentation; and
   sending the second instance of a media presentation description in response to receiving the join request.

6. The method of claim 1, wherein:
   a first period to send update information for the first segment has expired, and
   a second period to send update information for the second segment is currently being processed.

7. The method of claim 1, wherein using the location information to identify that the update to the media presentation description should include the first segment and the second segment comprises:
   determining that the client device has received segments up until the first segment but not including the first segment based on the location information;
   determining that the second segment is a current segment being included in the update to the media presentation description; and
   adding the update information for the first segment and the second segment to the instance of the media presentation description.

8. The method of claim 1, wherein the location information comprises first location information, and wherein sending the instance of the media presentation description comprises:
   including second location information in the instance of the media presentation description that indicates the client device has received up to the second segment in the media presentation.

9. The method of claim 8, wherein the first location information indicates the client device has received up to a third segment that is before the first segment.

10. The method of claim 1, wherein:
    the stored version of the media presentation description includes a full timeline of segments that have been received by the client device, and
    the instance of the media presentation description does not include a copy of the information for the full timeline of segments.

11. The method of claim 10, wherein the instance of the media presentation description includes an option to include the full timeline of segments in the update information.

12. The method of claim 1, wherein:
the update information is cacheable and is sent to a plurality of client devices.

13. The method of claim 1, further comprising:
prior to sending the instance of the media presentation description that includes the update information for the first segment and the second segment, sending an instance of the media presentation description that includes update information for the first segment, wherein the instance of the media presentation description that includes update information for the first segment is not received by the client device.

14. A non-transitory computer-readable storage medium containing instructions, that when executed, control a computer system to be configured for:
receiving a request from a client device, the request including location information for an update to a media presentation description for a media presentation;
using the location information to determine that the client device has not received a first segment based on the location information, wherein the media presentation description is currently sending updates for a second segment;
using the location information to identify that the update to the media presentation description should include the first segment and the second segment; and
sending an instance of the media presentation description that includes update information for the first segment and the second segment to update a stored version of the media presentation description for the client device.

15. A method comprising:
receiving, by a computing device, a first instance of a media presentation description for a media presentation, the first instance of the media presentation description including location information;
sending, by the computing device, a first request for an update to a media presentation description, the first request including the location information;
determining, by the computing device, that a first segment for the update has not been received;
sending, by the computing device, a second request for the update to the media presentation description, the second request including the location information; and
receiving, by the computing device, an instance of the media presentation description that includes update information for the first segment and a second segment to update a stored version of the media presentation description.

16. The method of claim 15, wherein:
a first period to send update information for the first segment has expired, and
a second period to send update information for the second segment is currently being processed.

17. The method of claim 15, further comprising:
updating the stored version of the media presentation description based on the update information.

18. The method of claim 15, wherein the instance of the media presentation includes a descriptor that indicates the instance of the media presentation is to update the stored version of the media presentation description and is not a full update to replace an entire version of the stored version of the media presentation description.

19. The method of claim 15, wherein:
the stored version of the media presentation description includes a full timeline of segments that have been received, and
the update does not include a copy of the information for the full timeline of segments.

20. The method of claim 15, wherein determining that the first segment for the update has not been received comprises:
waiting until an update period elapses to send the second request when the first segment has not been received.

* * * * *